United States Patent
Maggio

(10) Patent No.: US 7,775,312 B2
(45) Date of Patent: Aug. 17, 2010

(54) SURFACE TRAVERSING APPARATUS AND METHOD

(75) Inventor: Samuel J. Maggio, Ithaca, NY (US)

(73) Assignee: International Climbing Machines, Inc., Ithaca, NY (US)

( * ) Notice: Subject to any disclaimer, the term of this patent is extended or adjusted under 35 U.S.C. 154(b) by 700 days.

(21) Appl. No.: 10/574,062

(22) PCT Filed: Oct. 6, 2004

(86) PCT No.: PCT/US2004/032846

§ 371 (c)(1),
(2), (4) Date: Mar. 30, 2006

(87) PCT Pub. No.: WO2005/032920

PCT Pub. Date: Apr. 14, 2005

(65) Prior Publication Data

US 2006/0278454 A1 Dec. 14, 2006

Related U.S. Application Data

(63) Continuation-in-part of application No. 10/680,745, filed on Oct. 7, 2003, now Pat. No. 6,964,312.

(51) Int. Cl.
*B62D 57/00* (2006.01)
(52) U.S. Cl. .................. 180/164; 180/20; 15/340.1
(58) Field of Classification Search ............... 180/164, 180/116, 9.32, 20; 15/340.1
See application file for complete search history.

(56) References Cited

U.S. PATENT DOCUMENTS

| | | | |
|---|---|---|---|
| 3,168,069 A | 2/1965 | Everest et al. | |
| 3,170,532 A | 2/1965 | Boppart, Jr. | |
| 3,268,023 A | 8/1966 | DiNapoli, Jr. | |
| 3,276,529 A * | 10/1966 | Latimer-Needham | ....... 180/126 |
| 3,398,713 A * | 8/1968 | Hall | ......... 114/67 A |
| 3,512,602 A | 5/1970 | Bertelsen | |
| 3,763,957 A * | 10/1973 | Hunt | .......... 180/119 |
| 3,786,893 A * | 1/1974 | Joyce et al. | ................ 180/119 |
| 3,968,766 A * | 7/1976 | House | ..... 440/12.67 |
| 4,137,986 A * | 2/1979 | Schirtzinger | ............... 180/119 |
| 4,138,762 A | 2/1979 | Jost | |
| 4,282,946 A * | 8/1981 | MacGuire | .................. 180/128 |
| 4,301,568 A | 11/1981 | Poschlod | |

(Continued)

FOREIGN PATENT DOCUMENTS

EP 0 584 520 3/1994

(Continued)

*Primary Examiner*—Kevin Hurley
(74) *Attorney, Agent, or Firm*—Goodwin Procter LLP

(57) ABSTRACT

The invention concerns a surface traversing apparatus that includes a frame, a seal having a seal perimeter that is mounted to the frame, and a drive configured to move the apparatus relative to the surface. The seal perimeter is adapted substantially for rolling contact with the surface to be traversed. The device is capable of suction adhering and moving along horizontal, vertical, inverted surfaces and the like, and overcoming obstacles or surface irregularities while maintaining suction adhesion to the surface. The device can be propelled along the surface with a locomoting rolling seal assembly, which provides both a seal to affect the vacuum adhesion and the locomotion to drive the device across the surface.

24 Claims, 24 Drawing Sheets

U.S. PATENT DOCUMENTS

| | | | |
|---|---|---|---|
| 4,664,212 A * | 5/1987 | Nagatsuka et al. | 180/164 |
| 4,688,289 A * | 8/1987 | Urakami | 15/98 |
| 4,699,252 A * | 10/1987 | Sing | 188/5 |
| 4,713,896 A | 12/1987 | Jennens | |
| 4,765,773 A * | 8/1988 | Hopkins | 404/94 |
| 4,785,902 A * | 11/1988 | Ochiai | 180/164 |
| 4,926,957 A | 5/1990 | Urakami | |
| 4,971,591 A | 11/1990 | Raviv et al. | |
| 5,077,510 A | 12/1991 | Collie | |
| 5,121,805 A | 6/1992 | Collie | |
| 5,366,038 A * | 11/1994 | Hidetsugu et al. | 180/164 |
| 5,533,577 A * | 7/1996 | Jucker | 172/21 |
| 5,536,199 A | 7/1996 | Urakami | |
| 5,752,577 A | 5/1998 | Urakami | |
| 5,947,051 A | 9/1999 | Geiger | |
| 6,000,484 A | 12/1999 | Zoretich et al. | |
| 6,017,400 A | 1/2000 | Clark et al. | |
| 6,099,091 A | 8/2000 | Campbell | |
| 6,102,145 A | 8/2000 | Fisher | |
| 6,105,695 A | 8/2000 | Bar-Cohen et al. | |
| 6,276,478 B1 | 8/2001 | Hopkins et al. | |
| 6,412,133 B1 | 7/2002 | Erlich et al. | |
| 6,474,389 B1 * | 11/2002 | Steelman et al. | 156/382 |
| 6,520,234 B1 * | 2/2003 | Anderson et al. | 156/361 |
| 2002/0036108 A1 | 3/2002 | Jeswine et al. | |

FOREIGN PATENT DOCUMENTS

| | | |
|---|---|---|
| GB | 1 545 232 | 5/1979 |
| JP | 363170178 | 7/1963 |
| JP | 4154494 | 5/1992 |

* cited by examiner

SURFACE TRAVERSING APPARATUS AND METHOD

FIELD OF THE INVENTION

The present invention relates generally to the field of remote controlled devices and robotics. More specifically, the present invention relates to an apparatus for and methods of traversing while adhering to a surface.

CROSS-REFERENCE TO RELATED APPLICATION

This application claims the benefit of and priority to U.S. patent application Ser. No. 10/680,745 filed on Oct. 7, 2003, the disclosure of which is hereby incorporated herein by reference in its entirety.

BACKGROUND OF THE INVENTION

Remote controlled devices and robots are in use in various aspects of science and industry, including automotive, construction, exploratory, salvage, painting, surface preparation, diagnostic and environmental cleanup industries. Increasingly, there are instances requiring remote controlled devices capable of surface traversing or climbing. Innovation in this field would be beneficial for elevated height surface climbing or when surfaces need to be decontaminated, cleaned, or coated with devices that reduce exposure of humans to contamination and to potentially hazardous elevated height working conditions. This has led to the development of a sub-field of remote controlled devices and robotics relating to surface traversing and climbing.

One family of climbing devices known in the prior art employs suction or magnetic elements mounted on movable frames. See, for example, U.S. Pat. No. 6,000,484 to Zoretich, U.S. Pat. No. 5,121,805 to Collie, U.S. Pat. No. 5,077,510 to Collie, and U.S. Pat. No. 6,105,695 to Bar-Cohen et al., the disclosures of which are incorporated by reference herein in their entirety. In some devices in this family, two or more frames inch along through caterpillar-like motions. The first frame's suction cups adhere while the second frame moves freely along, and then the second frame suction cups adhere. At this point, the first frame detaches, frees itself, and pulls its frame up to the second frame. This method of movement keeps repeating through an attaching/detaching process. This approach to surface traversal is slow, erratic, and does not lend itself to operations where smooth, continuous travel is needed (such as cleaning, coating removal, decontamination surveys, etc.). Further, it has limitations in terms of surface obstacles that it can encounter and circumvent.

A second family of climbing devices known in the prior art employ suction cups mounted on endless tracks or otherwise. See, for example, U.S. Pat. No. 6,105,695 to Bar-Cohen, and U.S. Pat. No. 5,077,510 to Collie, the disclosures of which are incorporated by reference herein in their entirety. Devices employing suction cups on endless tracks require relatively flat surfaces because a large percentage of the suction cups must be in intimate sealing contact with the surface to affect adhesion. On rough or uneven surfaces, a large percentage of the suction cups are unable to make firm contact, thus the devices lose adhesion. Such devices are most appropriate for climbing the skin of large aircraft, where the surface is relatively smooth. Such a device would not work well on spalled concrete, where the surface is very uneven, or on many bridge structures where the surfaces include many plates bolted together. The large bolts and the unevenness of the plates render the suction cup adhering device ineffectual at negotiating these surfaces. The valving on this type of device is typically very complex, since the vacuum is only applied to the cups that are firmly secured and not applied to the cups that are not firmly secured to the surface. Otherwise, too much vacuum loss will occur. This has dramatically limited the use of this type of design to applications justifying a very complex and costly device and/or where relatively flat, smooth surfaces exist, such as commercial aircraft skins.

A third family of climbing devices known in the prior art incorporate a large suction chamber surrounded by a fixed seal partition that is dragged or slid over the surface being traversed. See, for example, U.S. Pat. No. 4,926,957 to Urakami, U.S. Pat. No. 5,536,199 to Urakami, U.S. Pat. No. 5,752,577 to Urakami, U.S. Pat. No. 6,102,145 to Fischer, and U.S. Pat. No. 3,268,023 to Napoli, the disclosures of which are incorporated by reference herein in their entirety. Wheels or endless tracks move devices in this family of machines. While the vacuum force in the large chamber affects adhesion to the surface, premature and excessive wear on the seal partition has lead to numerous attempted improvements in seal technology, such as vibrating seals or easily replaceable seal partitions. These devices, however, are limited to flat or relatively flat surfaces, because the seal partition, even those made from rubber or inflated diaphragms, are dragged over the surface. These devices cannot negotiate surface obstructions such as large bolts or plates without a suction loss. This, in turn, can result in the device falling from the surface. Furthermore, the dragging of the seal partition results in rapid seal wear and deterioration, necessitating frequent seal replacement. Of concern is predicting when the seal will fail from wear. The habitual failure of seals in this family of devices presents danger and reliability concerns, limiting their commercial acceptance and usage.

Thus, all the previous prior art examples exhibit limitations that render them ineffective in many practical, commercial conditions. While such devices do provide various systems for adhering to surfaces, in actual field operation, their limitations have restricted their uses to generally flat, obstacle-free surfaces. They cannot traverse surfaces commonly found in many real life settings. Accordingly, there exists a need for climbing devices that can traverse surfaces such as spalled concrete, corroded metal, or surfaces with bolts, plates, weldments, surface obstacles, sharp protrusions, or obstructions breaking the plane of the surface or where the surface is uneven.

Science and industry seek remote controlled or robotic devices that can effectively traverse a wide range of surfaces and surface conditions. In particular, devices presenting a high level of reliability, resistance to seal failures, and the ability to overcome uneven surfaces, common surface protrusions, or real life surface conditions are needed. Therefore, a need exists in the art to develop reliable climbing surface traversing devices capable of engaging a wide array of surface types and surface conditions.

SUMMARY OF THE INVENTION

One embodiment of the invention relates to a surface traversing device or apparatus capable of adhering to horizontal, tilted, vertical, and inverted surfaces, by vacuum force. The vacuum force or negative pressure is provided by a vacuum source that may or may not be located on the apparatus. A portion of a vacuum chamber is formed on an underside of the apparatus. This chamber is generally bounded by a top plate, that contacts a resilient rolling seal assembly, and the resilient rolling seal itself. The surface being traversed completes the sealed vacuum chamber when negative pressure is applied to adhere the apparatus to the surface. The present apparatus includes a resilient, rolling seal. The seal is generally defined by the seal perimeter, where the resilient, rolling seal contacts the traversable surface. Additionally, this seal partially defines the vacuum chamber volume that maintains suction adhesion to the surface. The seal can be driven into rolling action by a power delivery system, to locomote the apparatus along the surface. The resilient, rolling, seal of this embodiment enables the apparatus to move smoothly and, as necessary, climb over surface obstacles. The rolling and optional locomoting action of the seal provides enhanced durability and longevity, and overall system reliability. The resilience of the seal material conforms substantially completely to surface roughness, irregularities, and obstacles; thus, there is no significant loss of vacuum or suction due to leakage, regardless of the surface terrain of the surface being traversed by embodiments of the invention. There is, therefore, no loss of adhesion to the surface.

According to one aspect, one embodiment of the invention concerns a surface traversing apparatus. In general, the apparatus includes a frame, a seal having a seal perimeter that is mounted to the frame, and a drive configured to move the apparatus relative to the surface. Additionally, at least a portion of the seal perimeter is adapted substantially for rolling contact with a surface to be traversed. As such, portions of the seal perimeter or an additional secondary seal may be in sliding contact with the surface, in some embodiments.

In one embodiment, a portion of the seal perimeter includes at least one roller. In one embodiment, the at least one roller of the apparatus includes a resilient, compressible outer surface. The at least one roller includes a compressible outer surface. Additionally, the drive of the surface traversing apparatus can be adapted to power the at least one roller. In a particular embodiment, the seal perimeter of the apparatus includes at least two rollers. The at least two rollers are substantially parallel and disposed on opposing sides of the frame. In various embodiments, the seal perimeter of the apparatus includes a substantially closed polygon. In a particular embodiment, the polygon is a quadrilateral. In other embodiments, the seal perimeter may include combinations of arcuate and polygonal segments. In additional embodiments, some of these segments are in rolling contact with the surface while other segments are in sliding contact with the surface.

In still other embodiments, the at least one roller is supported by a pair of spaced axles, in effect giving the roller operating features of a track In various embodiments, track and rollers can be used interchangeably, to provide rolling and optionally locomoting elements that are supported by one or more axles, and/or are connected by a belt, and combinations thereof.

A portion of the seal perimeter of the surface traversing apparatus includes a track in various embodiments. Additionally, in various embodiments the drive is adapted to power the track. In one particular embodiment, the track includes a plurality of contiguous pads. At least one pad includes a flexible sealing element. In another embodiment, at least one pad includes a pair of independently compressible flexible sealing elements. In one embodiment, the apparatus' seal portion includes two tracks. The two tracks may be substantially parallel and disposed on opposing sides of the frame.

In various embodiments, the surface traversing apparatus further includes means for maintaining the apparatus in contact with the surface. The maintaining means includes a pressure differential relative to a zone defined at least in part by the seal perimeter. In one embodiment, the pressure differential is a partial vacuum. In various embodiments, the surface traversing apparatus further includes a processing apparatus mounted to the frame and adapted to process at least a portion of the surface being traversed. In various embodiments, the surface traversing apparatus further includes a processor for controlling the apparatus.

According to another aspect, one embodiment of the invention is also drawn to a surface traversing apparatus including a seal. In general, the apparatus includes a frame, a seal, and a drive. The seal is mounted to the frame and the drive is configured to move the apparatus relative to the surface. Further the seal is adapted substantially for rolling contact with the surface to be traversed. In one embodiment, the seal includes a perimeter, at least a portion of which cooperates with the drive to move the apparatus relative to the surface.

In one embodiment, front and rear tracks form part of the seal to increase rolling contact with the surface. A roller can be supported by a pair of spaced axles to form a track as part of the seal, to increase rolling contact and to enhance sealing with the surface.

According to yet another aspect, one embodiment of the invention is also drawn to a surface traversing apparatus including a locomoting seal. In general, the apparatus includes a frame, a locomoting seal, and a drive. The locomoting seal includes first and second substantially parallel rollers disposed on opposing sides of the frame and first and second tracks disposed on additional opposing sides of the frame. In this aspect, the rollers are rotatably connected to the frame. Further, the rollers and tracks are adapted substantially for rolling contact with the surface to be traversed and maintaining a seal with the surface, while the drive is configured to move the apparatus relative to the surface. In one embodiment, at least one of the first and second rollers forms an additional track.

According to a still further aspect, an embodiment of the invention is also drawn to a method of traversing a surface. The method includes the steps of providing an apparatus and traversing the surface with the apparatus. The apparatus includes a frame, a seal having a seal perimeter and a drive configured to move the apparatus relative to the surface. The seal is mounted to the frame and the seal perimeter is adapted substantially for rolling contact with the surface to be traversed.

Various embodiments are directed to a suction adhering device for performing a vast array of work activities. The activities include, but are not limited to: paint and coating removal, decontamination, surface buffing and cleaning, surface inspection, non-destructive testing, paint and coating application, remote welding or mechanical repair, and robotic repairing. The suction adhering device includes a frame, a seal assembly, a vacuum chamber, and one or more motors. The seal assembly includes rolling and/or conveying compliant, resilient materials forming a sealing partition. The seal assembly also serves optionally to locomote the machine along the surface, in various embodiments.

In one embodiment of the invention, the seal includes one resilient front roller, one resilient back roller, and two resilient side seals, designated left and right side seals. The entire seal partition forms a rectangular, square, polygonal, arcuate, circle, oval or otherwise suitably shaped region within the vacuum chamber or combinations thereof. The side seals may be highly resilient and compliant material, continuous or segmented to form a continuum, attached to an endless chain. Energy from the motor(s) is conveyed to the endless chain(s). The rotation of the chain causes the seal assembly to roll. This action locomotes the device across the surface. The high resilience and compliance of the seal allows the device to overcome surface obstacles while maintaining vacuum adhesion of the device to the surface. There may be at least two chain and resilient seal assemblies, at least one each for two opposing sides of the device. The resilient front roller and the resilient back roller are either free rolling or, in the alternative, powered by one or more of the same or additional motors.

The apparatus readily and reliably overcomes surface obstacles by the seal conforming to local surface conditions. Further, because the seal assembly rolls, obstacles or obstructions on the surface do not halt the progress of the machine nor do they cause any significant opening between the surface and the seal, through which unacceptable vacuum loss might occur. This allows the device to proceed across a surface while maintaining adhesion to the surface regardless of how rough or how many obstacles or irregularities are present on the surface. The vacuum is present while the device is driving along surface. Thus, the machine can move smoothly, without stopping, over surface roughness or irregularities or obstructions, and importantly, without losing suction adhesion over surface irregularities or surface roughness. Further, because the seal rolls and is not dragged, friction is minimal and power consumption is markedly reduced over prior art devices.

In another embodiment, various types of surface processing apparatus may be coupled to the surface traversing apparatus. Mechanical abraders such as brushes, Rotopeens®, needle guns, scabblers, etc. can be mounted on the device. A shroud placed over the abraders with a separate vacuum attached to this shroud effectively capture all the debris and transport it to filtered (such as HEPA filtered) vacuum collection drums or bins. Thus this device climbs, cleans, and captures hazardous or toxic materials and remediate them from work surfaces. This dramatically reduces exposure of humans to both elevated height conditions and exposure to hazardous or toxic materials. Grit-blasting, water-blasting, lasers, sponges, carbon dioxide, or any means or any other mechanical tools can also be utilized in the vacuumed shroud to affect climbing, cleaning, capturing and remediating capabilities of various embodiments.

Many nuclear and Department Of Energy (DOE) applications involve radiation testing and decontamination of structures, particularly concrete structures or metal tank structures where bolts, plates and surface roughness severely limit the usefulness of known devices, yet these are surfaces that can be effectively negotiated with various embodiments, with their enhanced ability to maintain suction adhesion while climbing over such surfaces.

In another embodiment, robotic arms are mounted to the device, thereby enabling the performance of an endless array of remote-controlled tasks such as, but not limited to, welding, cutting, sawing, lifting, performing repairs, etc.

The rolling seal used in various embodiments of this invention reduces the amount of energy required to move the device along surfaces. Overcoming the friction from fully static type seals of past products requires large motors and significant force, adding weight and energy consumption. Energy consumption and motor sizes can thereby be reduced using various embodiments of the invention.

The merits of the various embodiments of the invention dramatically expand the range of applications for climbing machines. These embodiments have significant commercial value, since the usefulness of climbing machines can now be expanded to include a far broader array of surface types and surface conditions than are now traversable, using the new seal assembly which resiliently rolls and in some embodiments locomotes over surfaces. In an alternative embodiment, none of the rolling seal elements in the seal assembly need be powered for locomotion. The rolling seal assembly can be used in combination with conventional wheels or tracks that independently locomote the apparatus, while the rolling seal performs the adhering function.

BRIEF DESCRIPTION OF THE DRAWINGS

The invention is pointed out with particularity in the appended claims. The advantages of the invention described above, together with further advantages, may be better understood by referring to the following detailed description taken in conjunction with the accompanying drawings. In the drawings, like reference characters generally refer to the same parts throughout the different views. The drawings are not necessarily to scale, emphasis instead generally being placed upon illustrating the principles of the invention.

DETAILED DESCRIPTION

The presently preferred and alternative embodiments of the invention, including the best mode for practicing the invention known to the inventor at this time, are now described in detail in connection with the accompanying drawings. The terms "device" and "apparatus" are used interchangeably in varying instances and contexts herein to refer to the surface traversing apparatus according to various embodiments of the invention.

Figure 1:
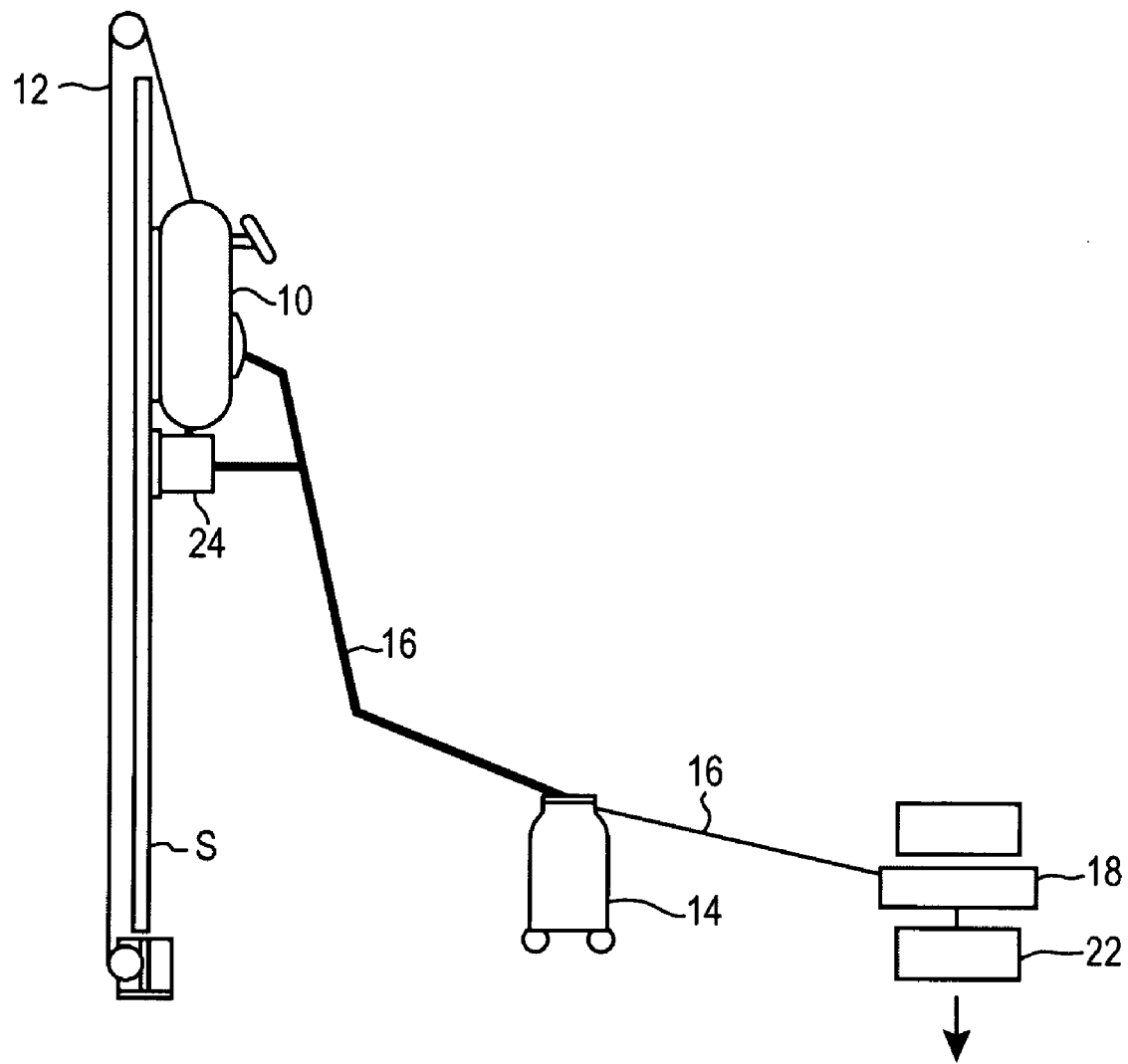
FIG. 1 is a schematic diagram depicting an embodiment of the invention in an illustrative environment.

Referring to FIG. 1, an embodiment of a surface traversing apparatus 10 is shown adhering to an exemplary vertical surface S. FIG. 1 is a schematic diagram depicting an embodiment of the apparatus 10 for the purpose of showing the apparatus 10 operating in a given exemplary environment. The device 10 can operate in various environments including, but not limited to underwater, radioactive, toxic, hazardous, varying altitudinal as well as conventional manufacturing and construction environments.

Further, various auxiliary and support components associated with the apparatus 10, in varying embodiments, are also shown in FIG. 1. These auxiliary components assist the operation or enhance the functionality of the apparatus 10; however, the components are generally not necessary to practice the core teachings of the invention's embodiments.

One of the auxiliary support components is an optional safety tether system 12. The safety tether system 12 is attached to the device 10 to facilitate the device 10 initially adhering to the surface S, as well as to ensure the apparatus 10 does not fall when the apparatus is 10 powered down or otherwise disengaged from the surface S. In various embodiments, the device 10 adheres to the surface S through a vacuum bounded, in part, by a locomoting seal disposed in contact with the surface. Additionally, a vacuum source 14, auxiliary to the apparatus 10, is in fluid communication with the apparatus 10.

A region of negative pressure or vacuum is supplied to the device 10 by the separate vacuum source 14 as shown in FIG. 1. This source 14 may or may not be located on the device 10 in various embodiments, yet the resultant vacuum force created within the space between the device 10 and the surface S and bounded by the seal provides the suction adhesion through which the device 10 adheres to the surface S. The vacuum is created in a chamber or chambers partitioned by the seal assembly of the apparatus 10 and the surface S to be traversed, as discussed in more detail below.

The means for establishing fluid communication between the vacuum source 14 and the device 10, in those instances where the vacuum source is not incorporated within the device 10, is achieved through an optional connecting conduit 16. Generally, the connecting conduit 16 can include one or more conduits, hoses, cables, wires or other transfer/transmission apparatus for connecting the apparatus 10 to a power supply, vacuum source 14, control mechanisms, pneumatic devices, and/or other suitable auxiliary devices or systems. Again, at a general level the connecting conduit(s) 16 serves to transfer fluid, gas, energy, chemicals, electricity, light, information, debris, or other suitable matter or data to and from the apparatus 10 to assist in the functioning of the apparatus.

A control system 18 typically including a processor coupled to the apparatus 10 through the conduit 16, although wireless, radio frequency or other communication scheme can be employed. The control system 18 provides user instructions to maneuver the device and/or control some or all of the subsystems included within or associated with the device 10. In various wireless embodiments, the control system 18 can transmit to and receive information from the apparatus 10 through means such as, for example, an infrared, cellular, sonic, optical or radio based interface, thereby obviating the need for a connecting conduit 16 to device 10 for control purposes. Exemplary control systems 18 include, but are not limited to, a handheld remote, a Personal Digital Assistant, a separate pendant controller, or computer/laptop.

The surface traversing apparatus 10 is also connected to a power supply 20 and an optional power converter 22 as shown in FIG. 1, while in other embodiments, a power source, such as a battery is incorporated within the device 10. The power converter may be for example an AC to DC converter or other suitable power conversion device. A pneumatic power supply is used to energize the device and/or its subsystems in various embodiments; however, electrical, solar, chemical, or other types of power supplies 20 can be used without limitation. A surface processing apparatus 24 is also shown coupled to the surface traversing apparatus 10. More details relating to the seal assembly, additional features and embodiments of the device 10, and the surface processing apparatus 24 are discussed below.

Figure 2A:
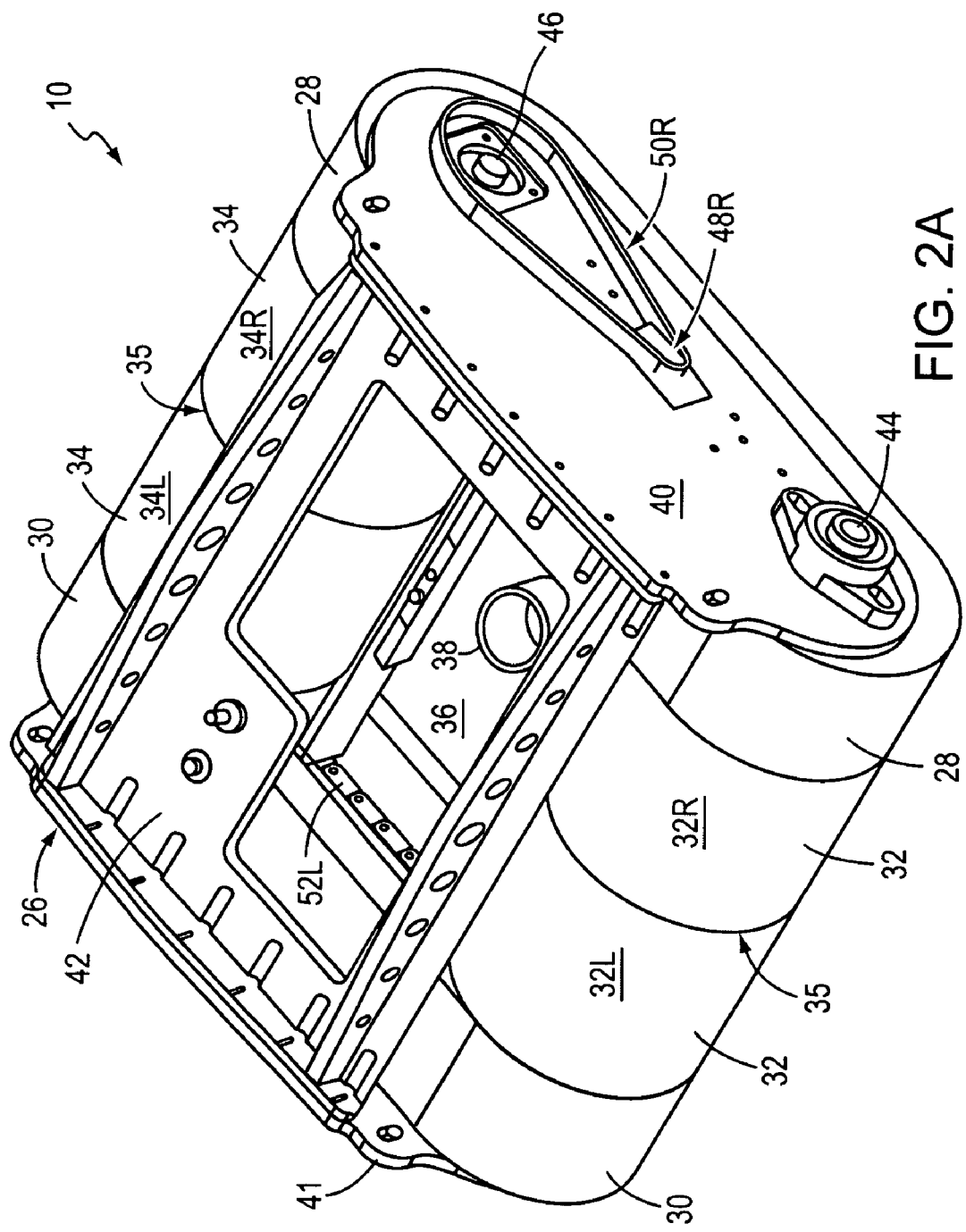
FIG. 2A is a top isometric schematic view depicting a surface traversing apparatus according to an illustrative embodiment of the invention.
Figure 2B:
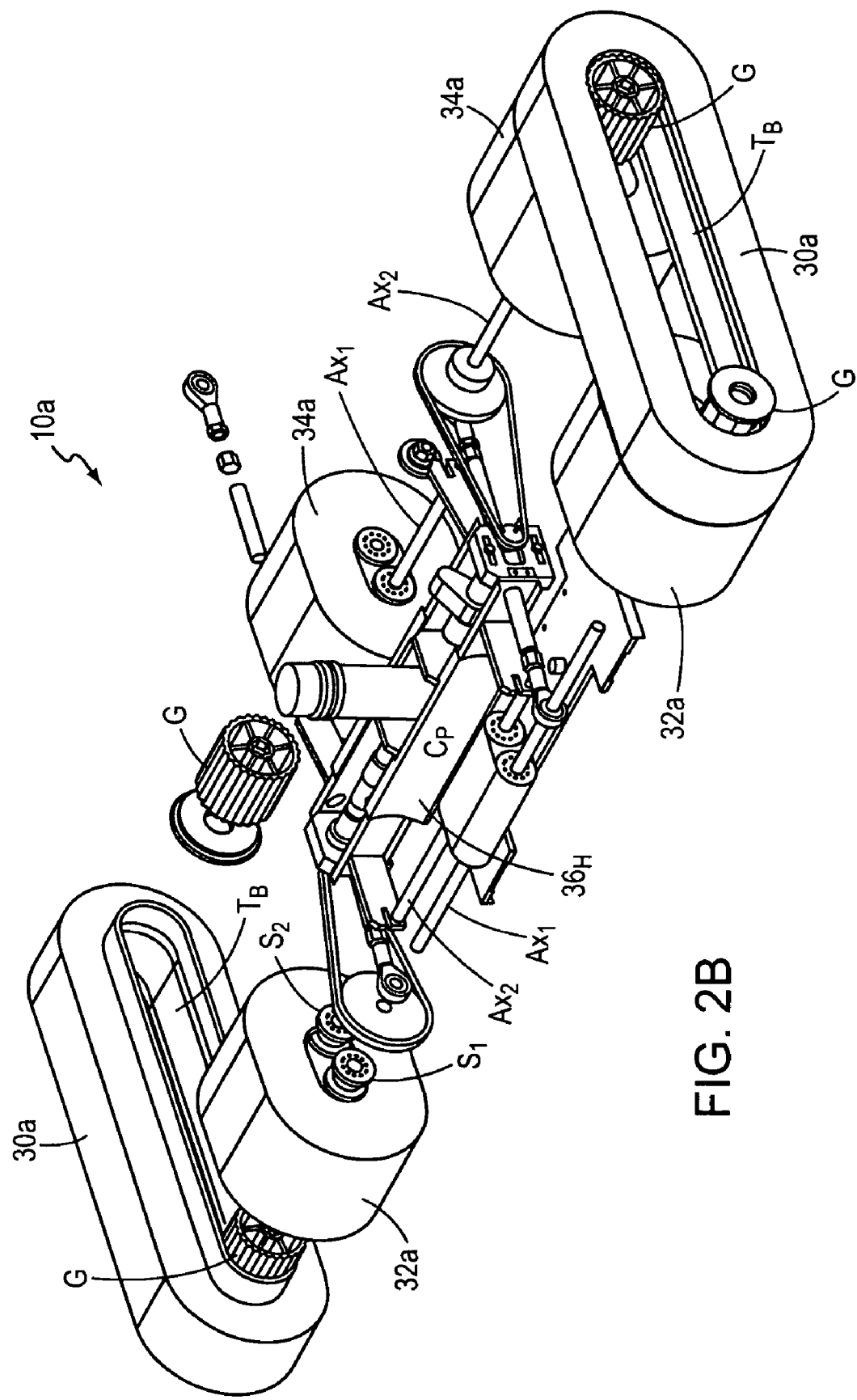
FIG. 2B is a top isometric exploded schematic view depicting a surface traversing apparatus having two continuous side track assemblies and front and back dual axle supported rollers according to another illustrative embodiment of the invention.
Figure 3:
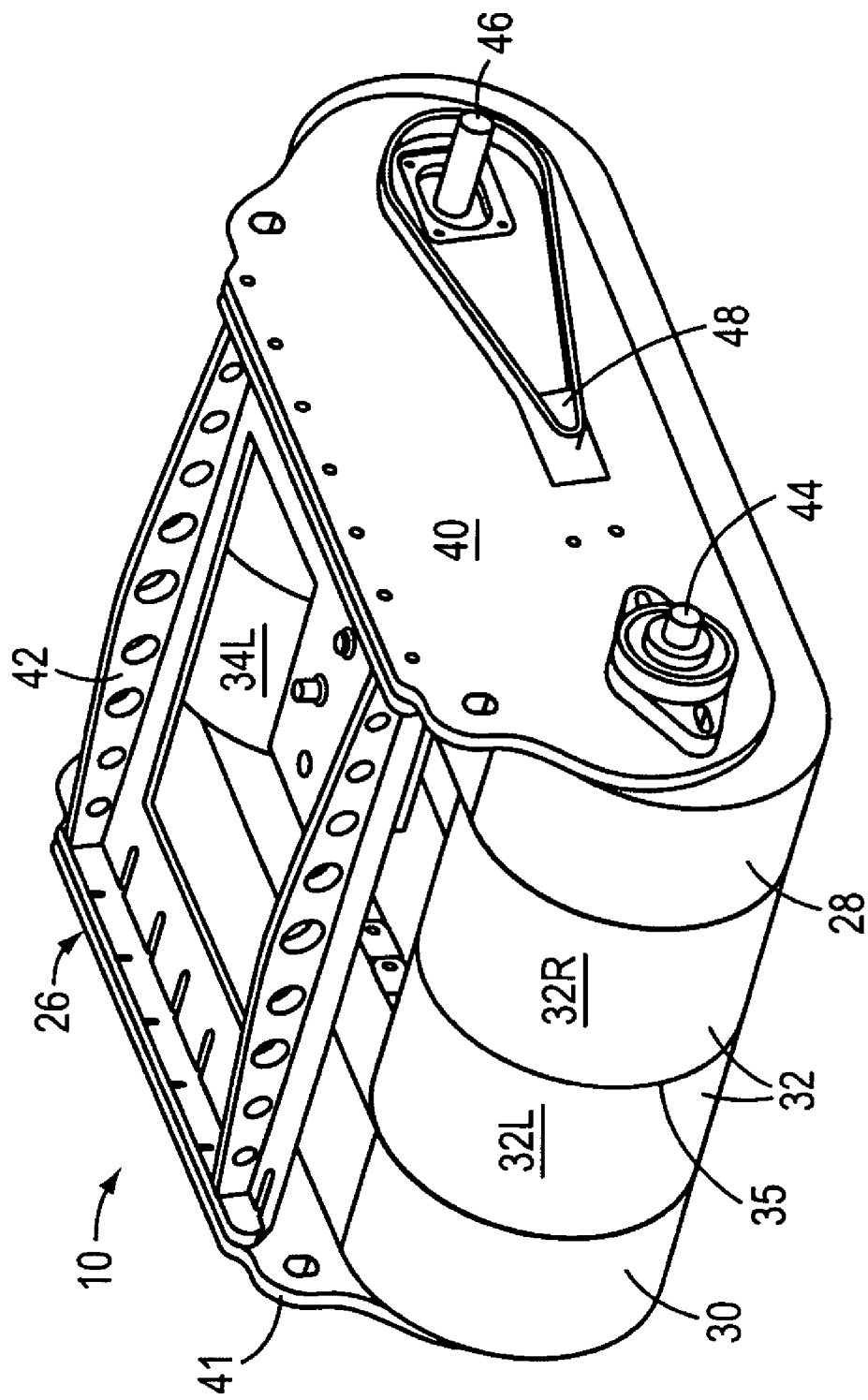
FIG. 3 is an alternative view of the illustrative embodiment depicted in FIG. 2A.

Referring to FIG. 2A, a top isometric schematic view of the surface traversing apparatus 10 according to an illustrative embodiment of the invention is shown. Similarly, FIG. 2B shows an alternative embodiment of a surface traversing apparatus 10a. FIG. 3 is an alternative view of the embodiment shown in FIG. 2A.

As depicted in FIG. 2A, the device 10 includes a pressure reduction frame or housing 26. The pressure reduction housing 26 supports the mechanical components of the device 10 and bounds in part, the vacuum or suction volume proximate the surface S to be traversed. The device 10 includes first and second endless side seal tracks 28, 30 on either side of the housing 26, and a front roller 32 and a back roller 34. The tracks 28, 30 are shown in more detail in FIGS. 6-8.

The front roller 32 may be split, such that the left side 32L of the front roller 32 (when viewed from the front) operates connected to the left track 30 and the right side 32R of the front roller operates in concert with the right track 28. The back roller 34 is also split, such that the left side 34L of the back roller 34 operates with the left track 30 and the right side 34R of the back roller operates with the right track 28. In various embodiments, the elements forming the seal, such as for example tracks or rollers, can be individually controllable and independently movable. In various embodiments, either one or both of the front and back rollers need not be split into right and left sides, but rather undivided rollers are used. The rollers, or portions thereof, may be powered or unpowered, as desired. These rollers 32, 34 typically include a relatively thick resilient outer material layer to facilitate navigating surface protrusions without loss of sealing.

Additional details relating to the surface traversing device 10 and the rollers 32, 34, and seal tracks 28, 30 introduced in FIG. 2A are presented in more detail below. In addition to these rollers and tracks, other elements and configurations can be used to provide an effective seal assembly. FIG. 2B illustrates one such alternative seal configuration, using a modified roller approach to achieve advantageous sealing and surface contacting properties.

Specifically, in FIG. 2B, instead of using the cylindrical front and back rollers depicted in FIG. 2A, the front rollers 32a and the back rollers 34a of the device 10a have been modified to operate effectively as tracks. This configuration allows each roller to function in a manner analogous to the continuous tracks 30a shown. The various rollers cooperate with the continuous tracks 30a to form a seal and move the device 10a in response to a motor or applied force.

As shown, each roller 32a, 34a is supported by first and second spaced axles $Ax_1$, $Ax_2$. Sprockets $S_1$ and $S_2$ or hubs can be disposed on the axles $Ax_1$, $Ax_2$ to support each roller. The dual axle configuration supports the roller for rotation along a generally extended oval path. Utilizing each roller as a track element advantageously increases the actual seal contacting area of the front and back rollers with the surface.

An enhanced seal area improves obstacle negotiation capabilities and operational reliability for the device 10, 10a. When the machine turns and/or negotiates surface obstacles, the increased area of the seal/surface interface maintains seal integrity and keeps the vacuum intact. Thus, a wider variety of maneuvers and irregular terrain negotiations are possible. Since, the device 10a may be used for various high-risk activities and in high toxicity environments, increased reliability is a very desirable operational feature. While use of the dual axle rollers may increase roller friction and marginally lower roller durability, the dual axle roller configuration may be used in combination with thicker, softer, and/or coated roller materials.

FIG. 2B also depicts an alternative vacuum sealing plate $36_H$. As shown in FIG. 2B and in FIG. 18C, the vacuum plate $36_H$ seals against the faces of the front and back rollers 32a, 34a at the two curved partitions $C_p$ that are formed to substantially match the outer diameter of the front and/or back rollers in this region. This vacuum plate $36_H$ configuration provides a larger sealing surface area between the vacuum plate $36_H$ and the front and back rollers 32a, 34a to provide a more reliable seal.

More specifically, the two partitions $C_p$ and central bridging portion of the vacuum plate $36_H$ form an "H" shaped plate. In one embodiment, the H plate $36_H$ can be located slightly higher up in the device than the plate 36 discussed above, to change the volume of the vacuum chamber.

Figure 18A:
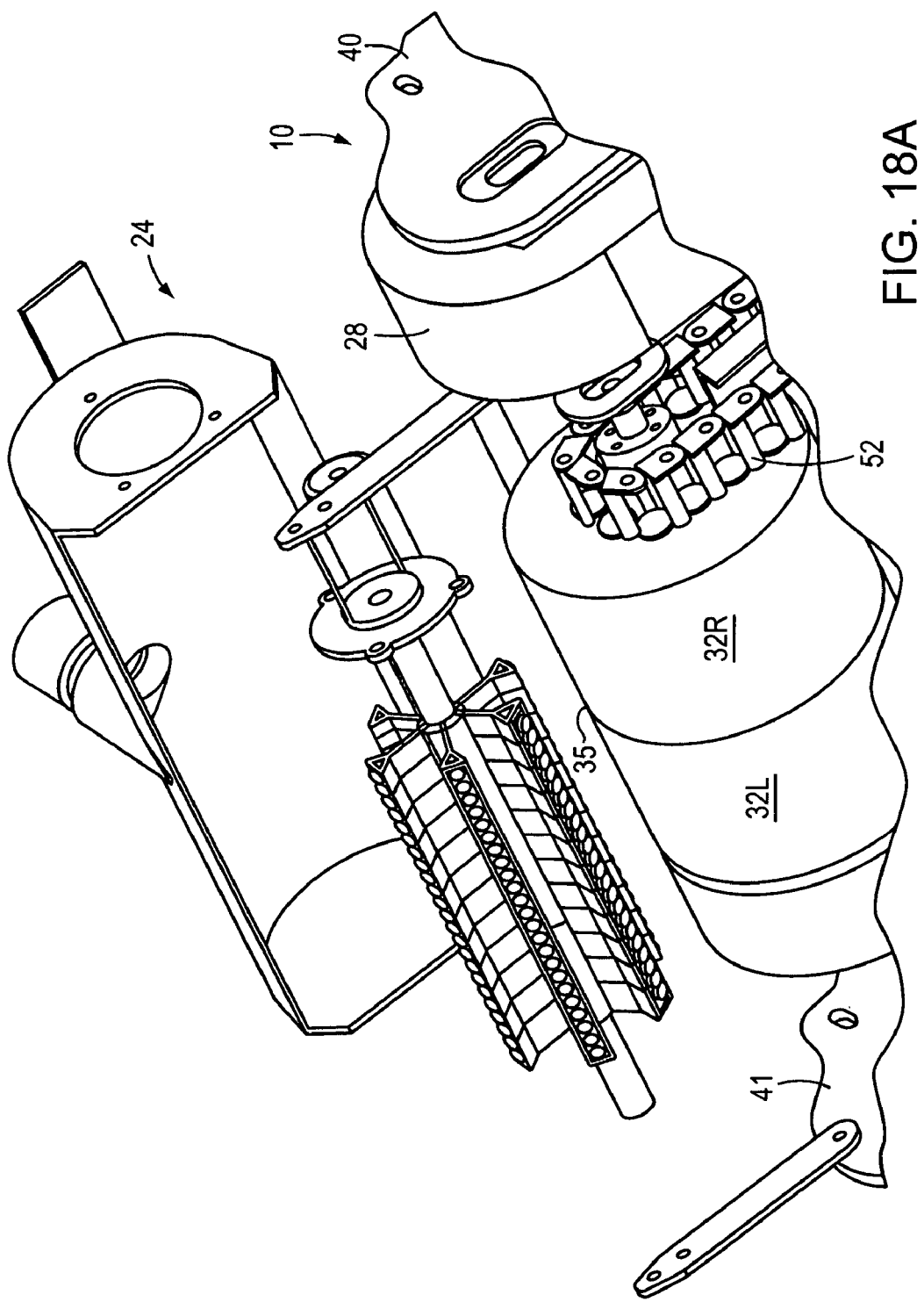
FIG. 18A is a bottom partial view of the apparatus depicted in FIG. 17.
Figure 18B:
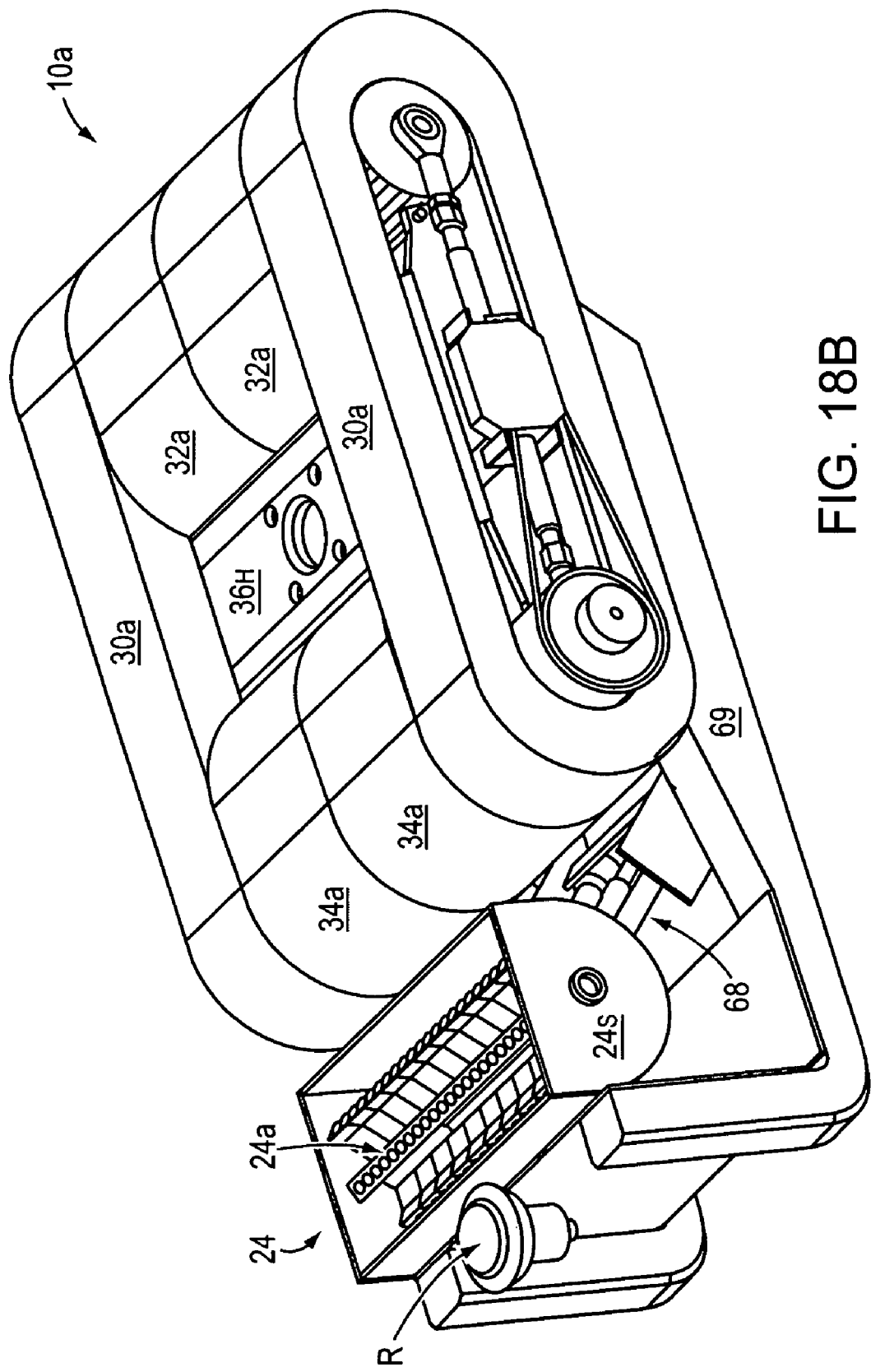
FIG. 18B is a bottom perspective view of the surface traversing apparatus of FIG. 2B with a trailing surface processing apparatus according to an illustrative embodiment of the invention.

In one embodiment, based upon the configuration shown in FIG. 2B, the bottom portion of the vacuum plate $36_H$ that is substantially parallel to the surface to be traversed ranges from about ¼" to ½" thick (See FIG. 18B). In one embodiment, the curved partitions $C_p$ of the sealing plate $36_H$ are about 3 inches wide. In one embodiment the curved partitions $C_p$ are formed from thin gauge aluminum; however, other suitable construction materials suitable for maintaining a vacuum can be used without limitation, as known to those of skill in the art. The use of the curved partitions $C_p$ and the H plate geometry yields a reliable front roller-to-vacuum plate and back roller-to-vacuum plate seal.

One embodiment of the device's power transmission system is depicted in FIG. 2B. The device 10a uses flexible timing belts $T_B$ to drive or locomote the tracks 30a, rather than the chains used in the embodiment of FIG. 2A. The timing belts $T_B$ provide very good transfer of kinetic drive forces, decrease weight, and provide a very good sealing face to run along the runners/slides of H plate $36_H$.

In one embodiment, the timing belts $T_B$ are as wide as the tracks 30a and the timing belts are adhered to the inside surfaces of the foam side tracks. Although adhesives can be used, the belts $T_B$ can also be secured to the tracks 30a using friction, prongs, grippers or other suitable attachment mechanisms. The grooves or teeth of each timing belt $T_B$ are driven by grooved plastic rollers or timing pulleys. There are four grooved plastic rollers G and each respective roller G is positioned at one of the corners of the device 10a. In some embodiments, the rollers are optional and other rotatable elements can be used. Using plastic or other lightweight materials for the various drive, seal, frame and other system components substantially reduces the weight of the device. Specifically, the timing belt configuration allows for the use of other light plastic elements rather than the heavier metal sprockets typically required to drive various metal track chains. Since device weight reduction may be related to improved surface adhesion and operational device reliability, it may be desirable in various applications to select weight reducing materials in the form of composites and other strong, light-weight materials.

Returning to referring to FIGS. 2A and 3, and as discussed above, the front and back rollers 32, 34 are split in order that the right portion of the front/back rollers roll (turn) with the right track 28 and the left portion of the front/back rollers roll (turn) with the left track 30. An annular sheet of thin film Mylar® 35 or other high lubricity material 35 may be provided between the roller halves to separate the left 32L, 34L and right 32R, 34R sides of both front and back rollers 32, 34 and reduce friction. This allows the rollers 32, 34 to move in opposite directions while not interfering with or dragging on the other. In various embodiments, the rollers 32, 34 can be segmented circumferentially into a plurality of individually independently movable sealing elements. Alternatively, in other embodiments, the rollers 32 and 34 may each be one undivided substantially cylindrical resilient element, or any number of proximately disposed annular resilient elements.

The front and back rollers 32, 34 may also mount to suspension systems incorporated within the device 10 to permit upward and downward movement of the rollers 32, 34 relative to the housing 26 thereby further enhancing the ability of the machine 10 to negotiate surface irregularities and obstacles while maintaining the seal continuity, hence maintaining the vacuum force between the device 10 and the surface S.

Figure 4:
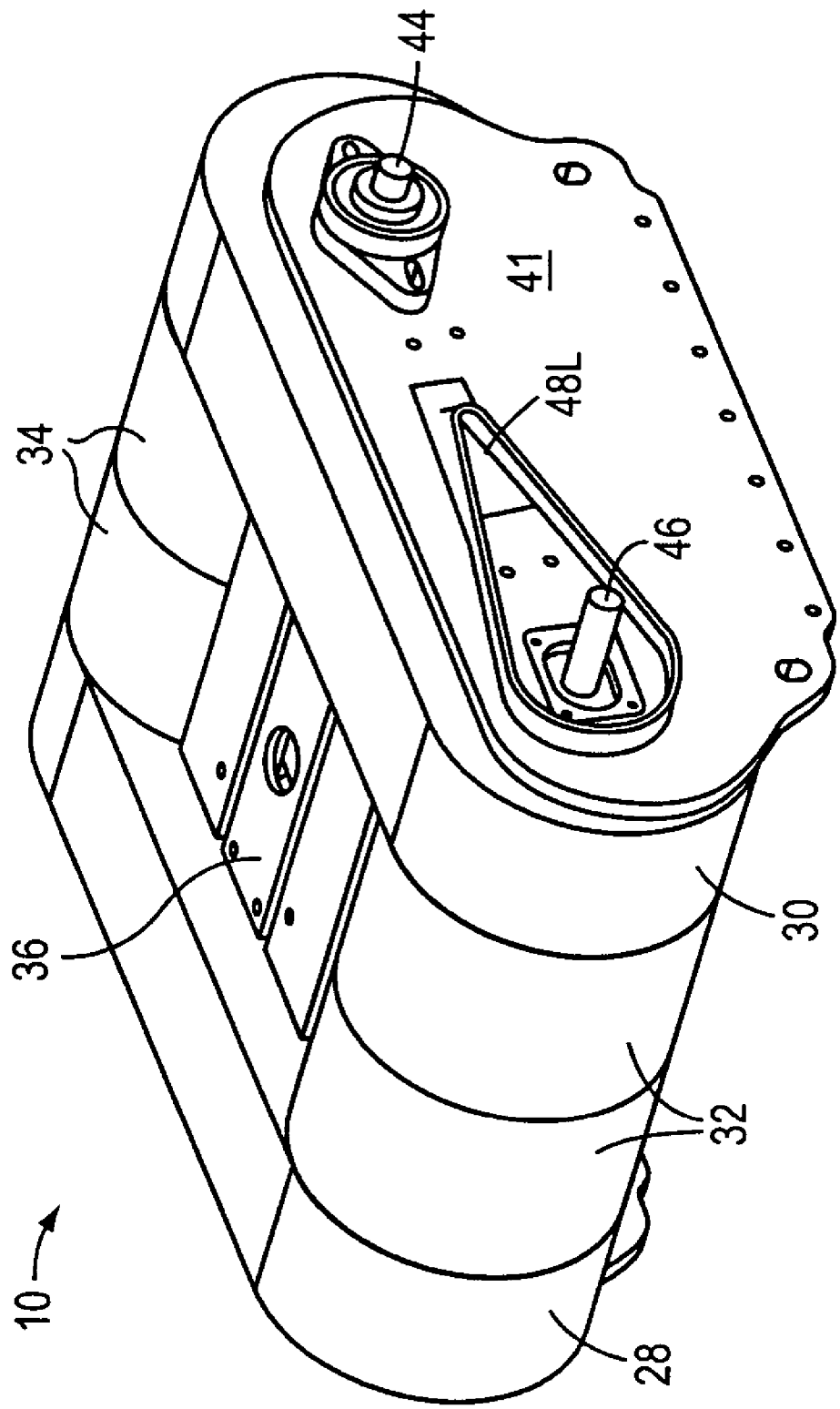
FIG. 4 is a bottom isometric schematic view depicting a surface traversing apparatus according to an illustrative embodiment of the invention.

Again referring to FIGS. 2A and 3, a sealing plate 36 defines a portion of a lower vacuum chamber. The sealing plate 36 extends from and seals against the side seal tracks 28, 30 and the front and back rollers 32, 34, thus enabling the formation of a substantially complete seal within the vacuum chamber when the device 10 contacts a surface S and a vacuum is applied in the vacuum chamber. The sealing plate 36 includes a connection port 38, shown as a raised annular ring with which the connection conduit 16 and/or the vacuum source 14 can be coupled, thereby facilitating the formation of a vacuum in the vacuum chamber. FIG. 4 shows a bottom view of the device 10, showing this vacuum chamber as bounded by the seal elements of this illustrative embodiment. In this embodiment, the seal elements include the two rollers 32, 34 and the two endless tracks 28, 30.

Figure 5B:
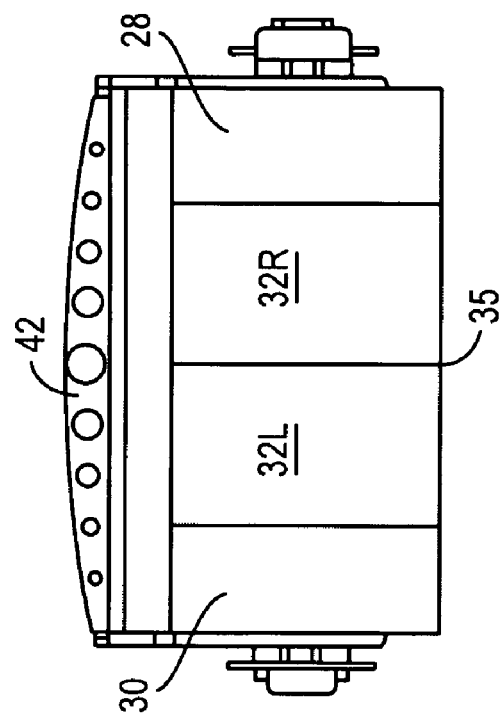
FIGS. 5A and 5B are schematic side and end views, respectively, depicting a surface traversing apparatus according to an illustrative embodiment of the invention.
Figure 5A:
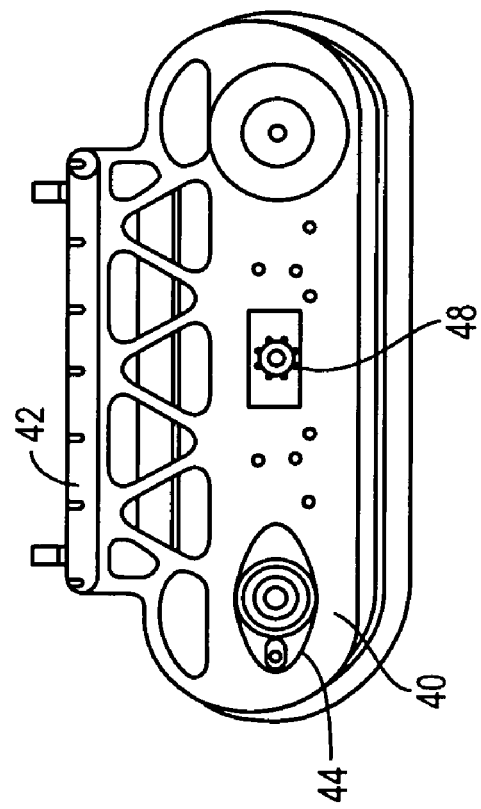

Returning to FIGS. 2A and 3, the track and roller assemblies are mounted to the frame or housing 26 of the device 10. The frame includes two structural side panels 40, 41 and a structural top panel 42, essentially forming an inverted "U-shaped" housing 26. Additional views of the side and top panels are shown in FIGS. 5A-5B. Generally, the frame can assume any configuration suitable for attaching the seal elements and various frame configurations known in the art relating to various robotic chasses, housings, mountings and so forth teach frames within the scope of the present invention.

In FIGS. 2A and 3, a front axle 44 and a rear axle 46 run perpendicular to the side panels 40, 41 through the device 10. The front axle 44 runs through both side tracks 28, 30 and through the front roller 32 assembly. The rear axle 46 also runs through both side tracks 28, 30 and through the back roller 34 assembly. The front and rear axles 44, 46 also each include a drive sprocket 47 on one end.

Two motors 48R, 48L (generally 48) provide the driving force for the side tracks 28, 30 as well as the front/back rollers 32, 34 in the embodiment illustrated. In various embodiments, air or pneumatic motors are employed, however any type of power delivery device, such as an electrically powered motor can be used in the device 10.

Figure 17:
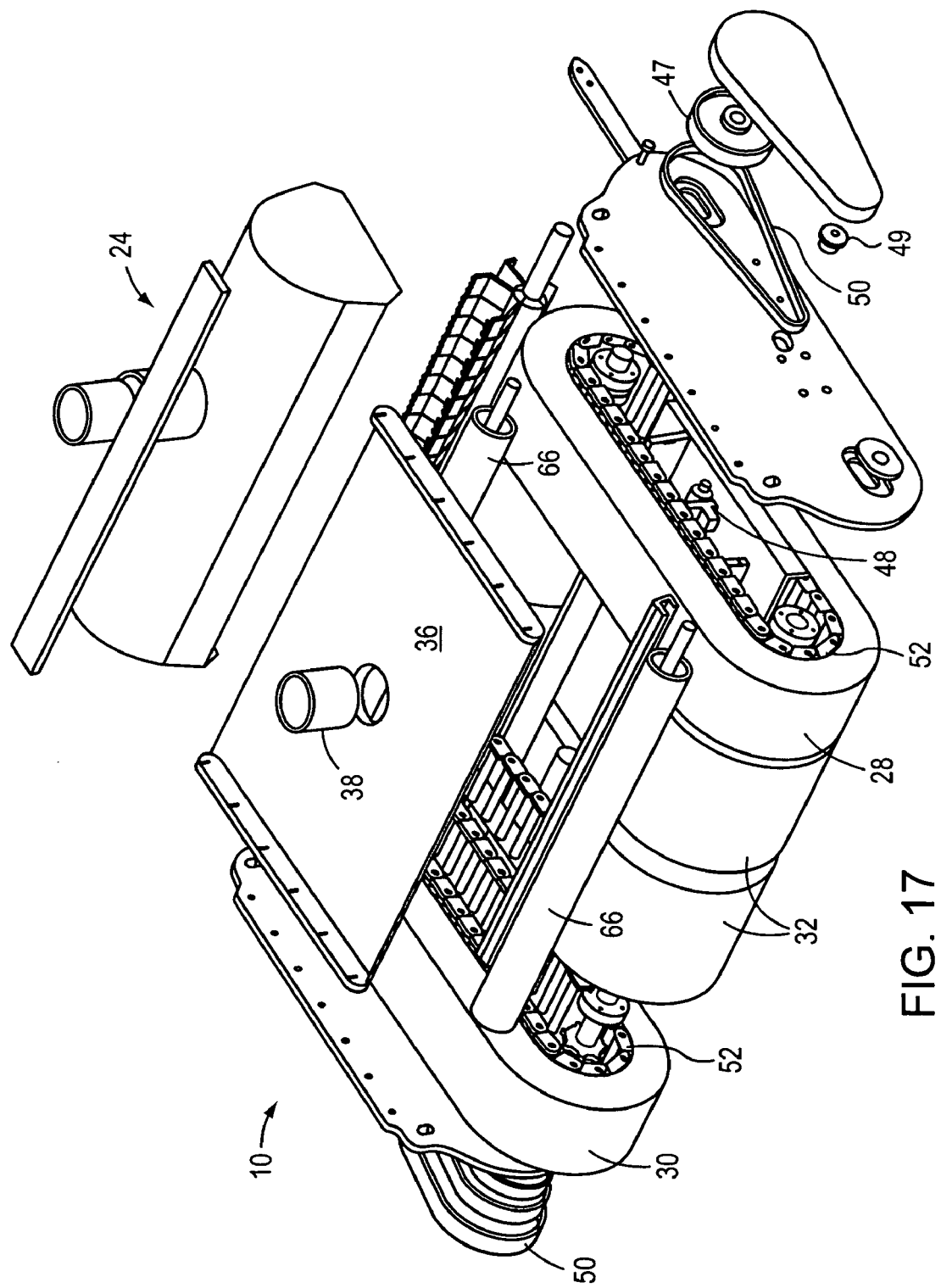
FIG. 17 is an exploded perspective view of a surface traversing apparatus with a trailing surface processing apparatus according to an illustrative embodiment of the invention.

A sprocket 49 is attached to a shaft of each motor 48. An endless chain (generally 50) runs from each motor sprocket 49 to each axle sprocket 47. There are two chains 50L, 50R, one for each motor sprocket 49 and axle sprocket 47 pair. The axle sprockets 47 are attached one per axle 44, 46. Additional detail regarding the endless chains 50 are shown in FIG. 17. Naturally, alternative drives and power transmission components may be employed, such as belts, flexible shafts, gears, kinematic linkages, etc.

The right motor 48R, the right motor sprocket 49, the right chain 50R, and the right axle sprocket 47 all function in unison to drive the right track 28 and the right side of the front and back rollers 32R, 34R. Since the motors are reversible, the left motor 48L functions to drive the left half of the seal assembly both forward and reverse. The left motor 48L and related assemblies operate in the same fashion as their right side counterparts. Turning of the device 10 is accomplished by driving one side of the device 10 forward while driving the other side of the device in reverse or alternatively, by just driving one side of the device. Additional detailing showing the orientation of the chains 50L, 50R and the motors 48 is shown in FIG. 17.

Figure 6:
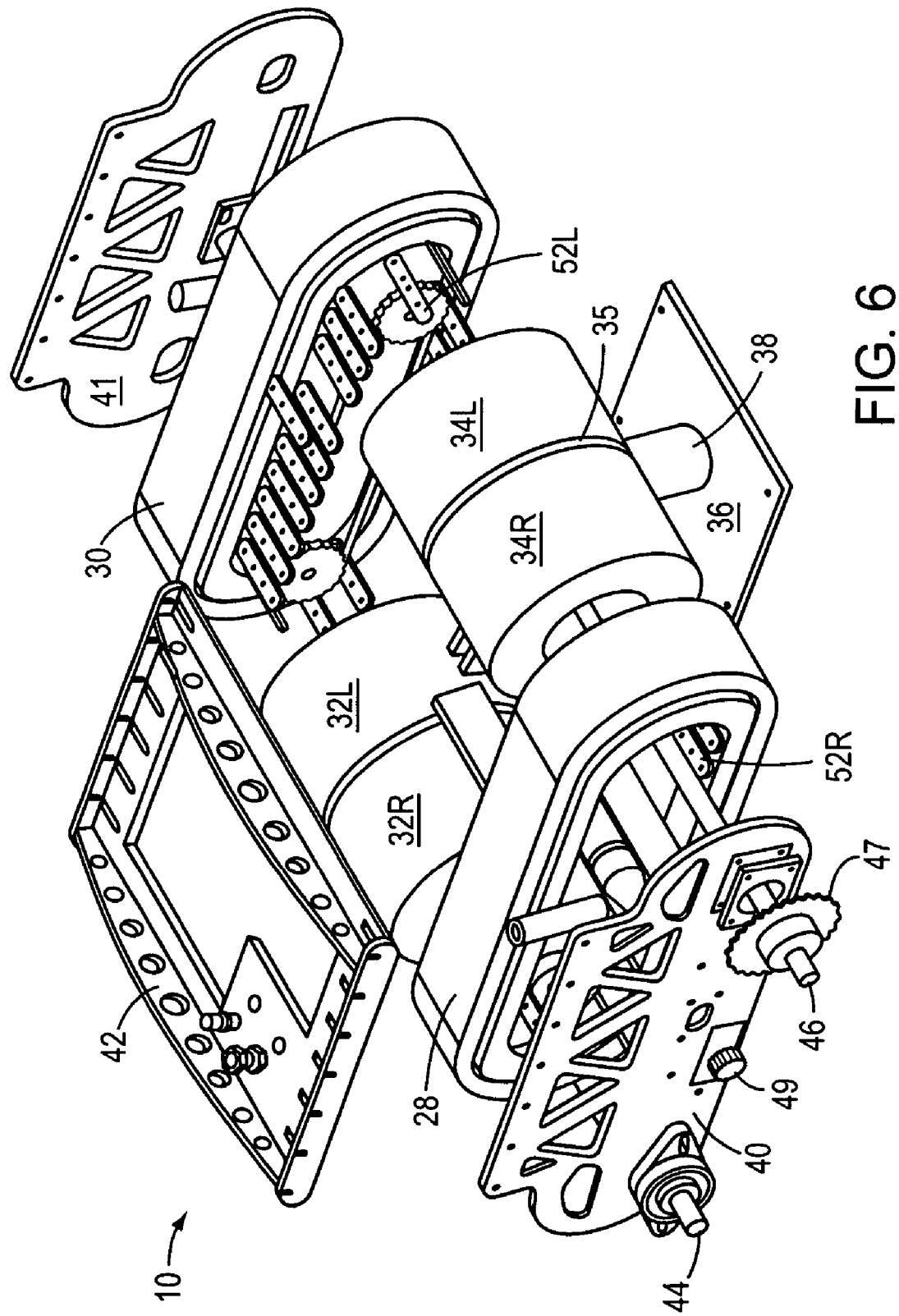
FIG. 6 is a top isometric exploded view depicting a surface traversing apparatus according to an illustrative embodiment of the invention.
Figure 7:
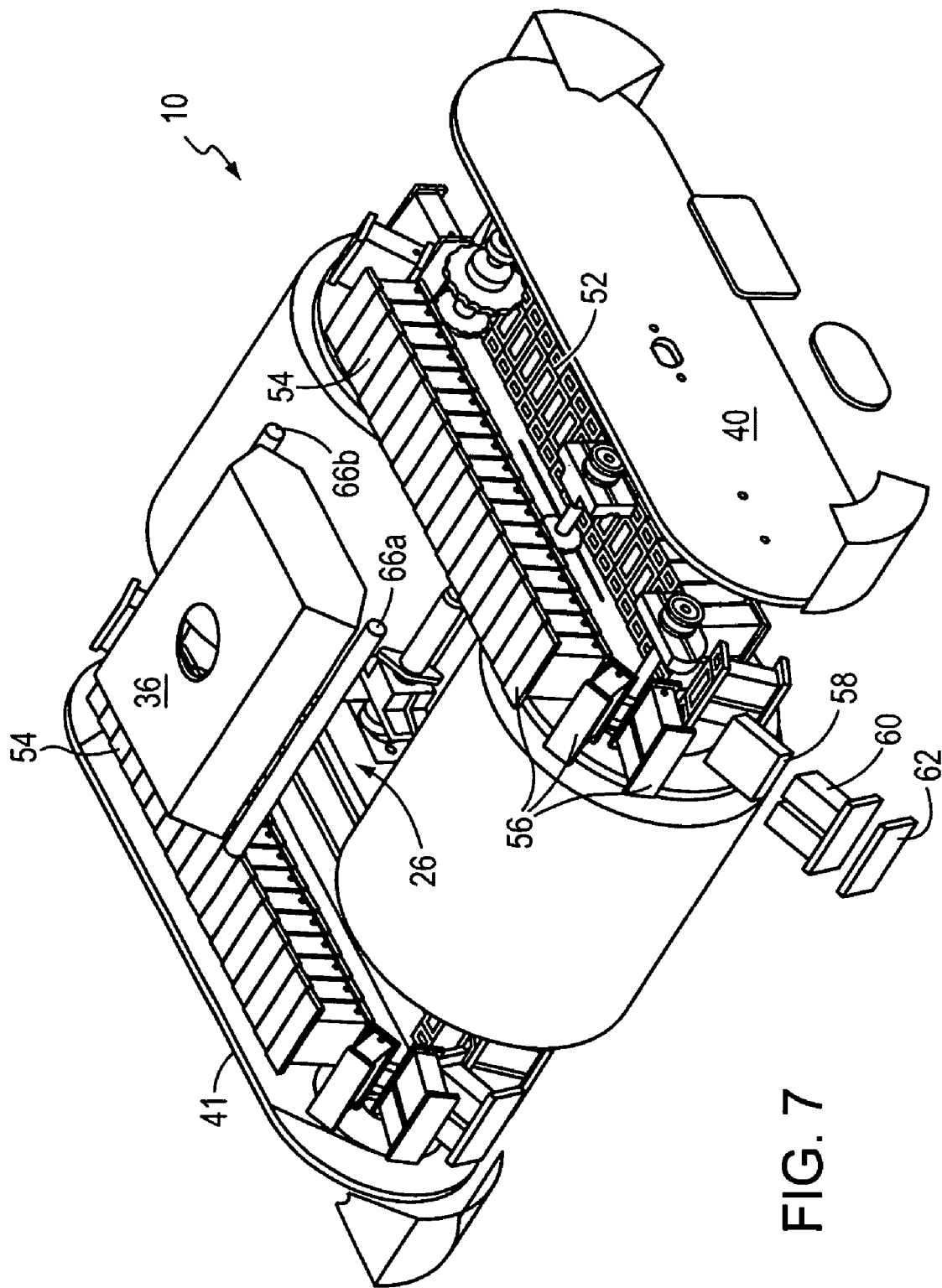
FIG. 7 is a bottom isometric exploded view depicting a surface traversing apparatus having a segmented track assembly according to an illustrative embodiment of the invention.
Figure 8:
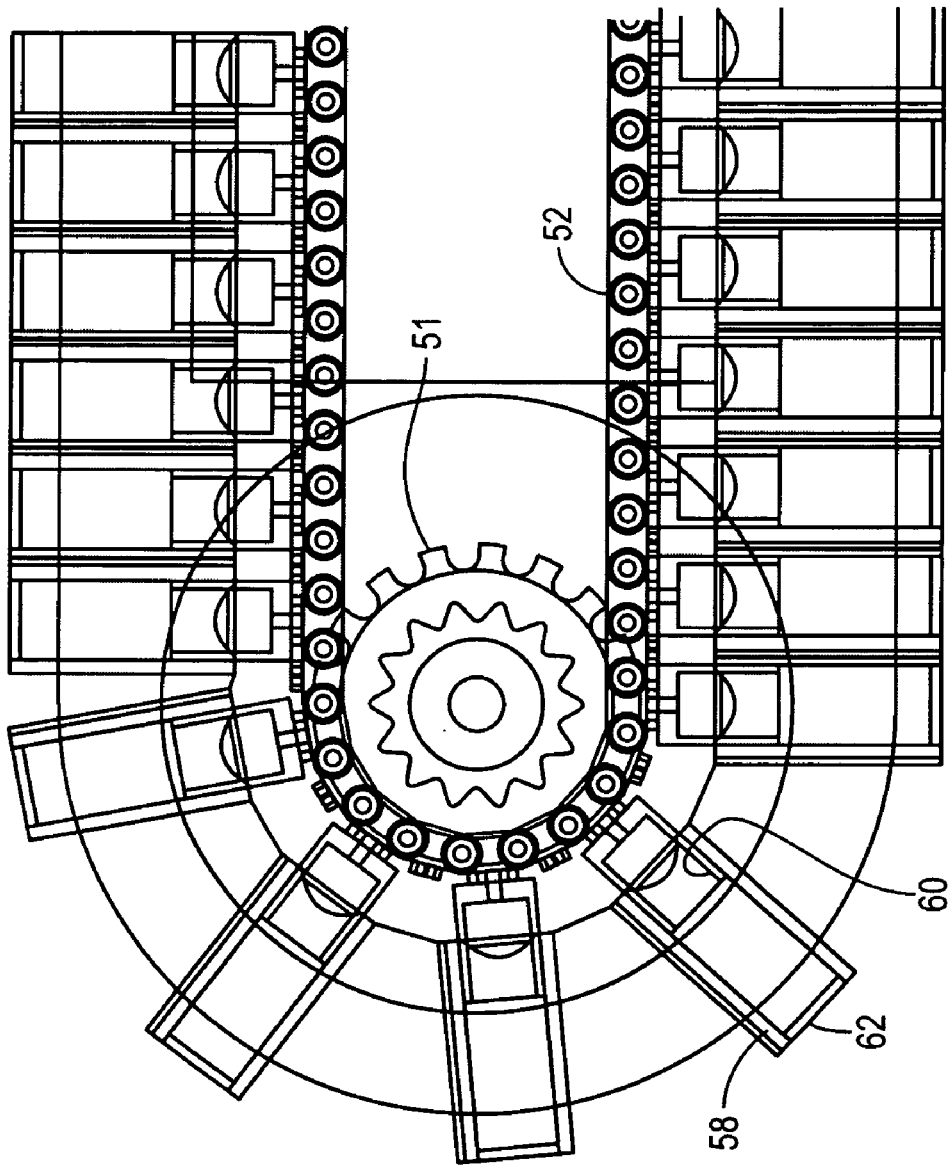
FIG. 8 is an enlarged schematic side view depicting a portion of a segmented track assembly hub according to an illustrative embodiment of the invention.

Turning to FIG. 6, to drive the tracks 28, 30 in their endless paths of travel, cogs or sprockets 51 are mounted on the axles 44, 46. These cogs/sprockets 51 transfer rotational force from the axles 44, 46 to the endless side tracks 28, 30. The side track assemblies consist of a track chain 52L, 52R (generally 52) of high strength material construction. More detail of the track chain 52 is shown in FIGS. 6-8. Additionally, FIG. 17 provides an exploded view further detailing the relationship between endless chains 50 and track chains 52. Attached to track chain 52 via mechanical fasteners and/or glue is a relatively thick outer layer of highly flexible, compliant, resilient material, such as closed cell foam, rubber, neoprene, etc. This flexible/resilient material forms the side seals for the vacuum chamber. As the tracks and rollers move, the seal they form also both engages and rolls across the surface. Thus the seal employed in various aspects of the invention is a source of locomotion along with the mechanism for adhering to the surface. The surface contacting materials of the rollers and tracks are chosen such that they possess highly flexible, resilient properties, thereby ensuring that a seal is maintained as the machine locomotes over the surface, even over highly irregular surfaces and/or over surface obstacles. Optionally, an additional outer layer or coatings can be provided, for example to change the coefficient of friction, provide tackiness, modify puncture or abrasion resistance, etc. In general, however, such outer layers or coatings are not required.

The front/back rollers 32, 34 encircle the front/back axles 44, 46. These rollers 32, 34 fit in between the side tracks 28, 30 and run perpendicular to the side tracks 28, 30. These rollers may include a relatively hard core that fits over the round axles, allowing the rollers 32, 34 to spin freely relative to the axles. The hard core is essentially a cylinder with a small-bore hole to fit over the axles. The outer diameter of the hard core receives a relatively thick layer of highly flexible, compliant, resilient material, similar to that used on the tracks, that is wrapped around and secured to the core. The flexibility/resilience of this material serves to affect a seal for the vacuum chamber as the rollers roll over the surfaces, even over the surface irregularities and/or surface obstructions. Depending on the nature of the surface to be traversed, the radial thickness of the sealing layer can be up to about 25%, 50%, 75% or more of the total radius of the roller.

Referring to FIG. 7, an alternative segmented track assembly 54 is shown, instead of the continuous outer layer depicted in FIG. 6. Specifically, two segmented track assemblies 54 are attached to the frame of the device 10. Track chains 52 are also incorporated in this track assembly 54. Rather than attaching to a resilient continuous band of material, the track chain 52 attaches to a plurality of individual track elements 56. These individual elements 56 are individually deflectable or compressible, in various embodiments, to facilitate maintaining a vacuum seal when a bolt or other surface protrusion is encountered by the track assembly 54. When a surface protrusion compresses one or more segmented elements 56, the remaining elements 56 of the track will still form a seal with the protrusion disposed in a pocket of the track assembly 54 formed by the compressed elements 56. Each individual track element 56 includes a first fixed portion 58, a second telescoping outwardly biased second portion 60 capable of sliding relative to the fixed portion 58, and a resilient outer layer 62. Further detail regarding the plurality of segmented track elements 56 is shown in FIG. 8.

Figure 9:
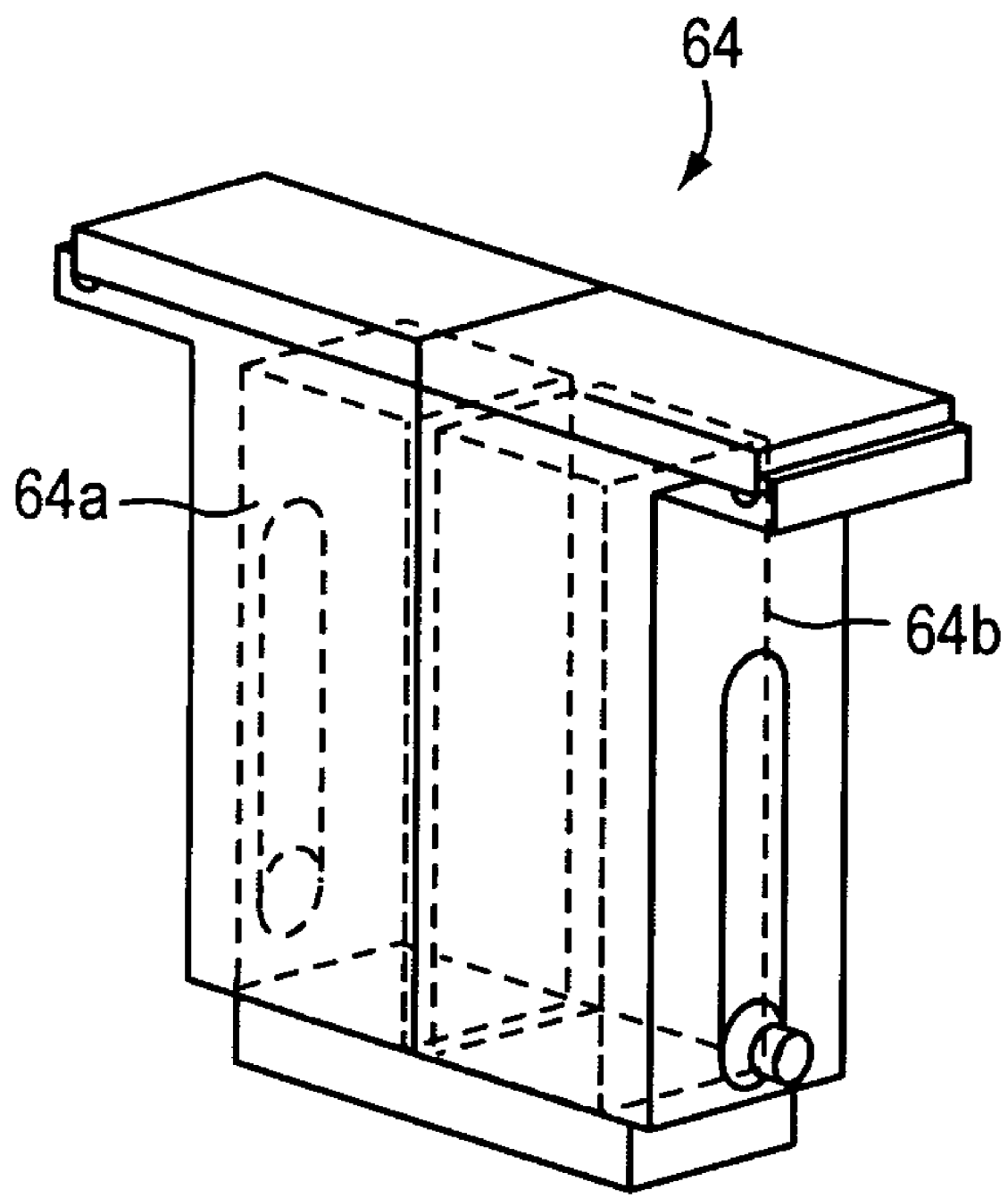
FIG. 9 is an enlarged schematic perspective view of a split segmented track assembly element according to an alternative illustrative embodiment of the invention.

Additionally, FIG. 9 illustrates an alternative type of track element 64 suitable for inclusion within a larger segmented track assembly 54. Each track element 64 is divided into two sub-elements 64a and 64b, both of which are individually independently compressible. Thus, by dividing each individual track element 64 into two compressible sub-elements 64a, 64b, when a surface protrusion, such as bolt, is encountered the likelihood of maintaining the seal is increased. This follows, because the protrusion may be positioned to cause only one portion 64a or 64b of the track element 64 to compress, while the remaining track elements 64 and the other seal constituent elements remain unperturbed. Thus, the vacuum seal is maintained around the surface protrusion with only a minor disturbance to the seal assembly, thereby ensuring adherence to the surface being traversed.

Returning to FIGS. 7 and 17, first and second mini-rollers 66a, 66b (generally 66) are provided, in order achieve a near frictionless seal between the front and back rollers 32, 34 and the sealing plate 36 of the vacuum chamber. A first mini-roller assembly exists between the front rollers 32 and the plate 36 and a separate second mini roller assembly exists between the back rollers 34 and the plate 36. These mini rollers 66a, 66b serve to fill any space between the front/back rollers 32, 34 and the sealing plate 36. Moreover, these mini-roller assemblies enhance the sealing function by maintaining a seal around the plate 36 while the device 10 is locomoting upon a given surface. In one embodiment, these mini roller assemblies may be spring loaded. Thus, they automatically adjust frontward and backward for any front-to-back movement that the rollers 32, 34 may encounter or for any wear on the front/back roller assemblies. These mini rollers 66a, 66b also serve to swipe or clean the rollers 32, 34 of debris during operation.

Figure 10:
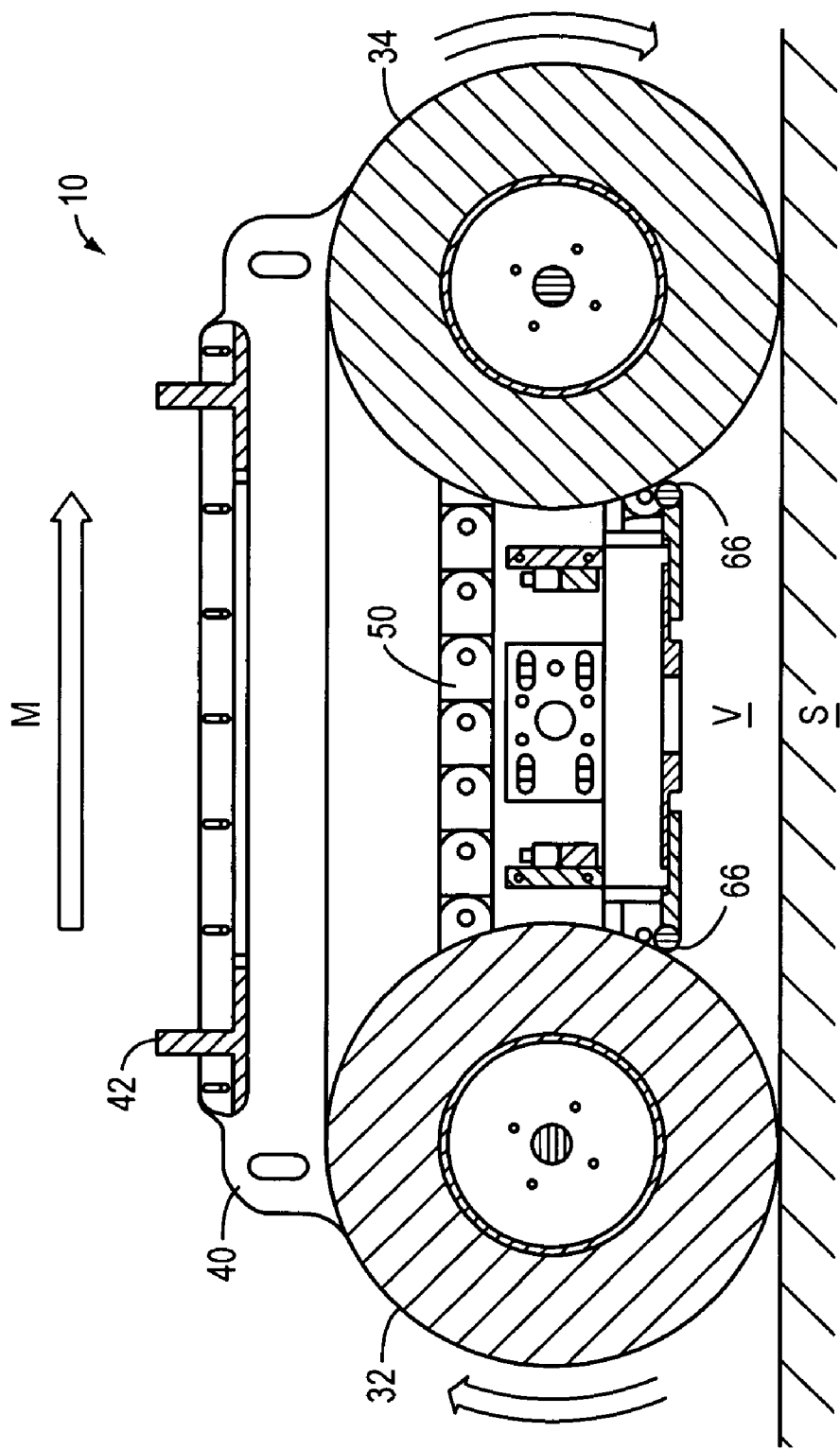
FIG. 10 is a cross-sectional schematic side view of a surface traversing apparatus, according to an illustrative embodiment of the invention, adhering to an exemplary surface.

Turning to FIG. 10, a cross-sectional schematic side view of the surface traversing apparatus 10 adhering to an exemplary surface S while moving in a direction M is shown. A three dimensional region or vacuum volume V is defined by the substantially cylindrical resilient surface portions of rollers 32, 34; the resilient surface materials of the tracks 28, 30; and the surface being traversed S. Thus, one embodiment of a locomoting seal is illustrated. Typically, a vacuum source 14, either incorporated within or separate from the device 10, is brought into fluid communication with region V. Once negative pressure sufficient to provide suction adhesion of the device 10 is achieved and maintained by the seal elements 28, 30, 32, 34, those elements can be energized to move the device along the surface S. Additionally, as addressed above, the use of resilient materials, continuous or segmented tracks, and optionally individually compressible divided track elements can be used to ensure the seal integrity is maintained when surface irregularities or protrusions are encountered.

"Sliding" of the seal on the surface S contributes to abrasion and wear of the seal. Rolling contact is generally the preferred movement It is understood that the device 10 and the seal will undergo some insubstantial amount of sliding contact, such as when turning. In operation, however, it will be understood by those skilled in the art the primary principle of operation of the seal, including when turning, is by substantially rolling contact.

Figure 19:
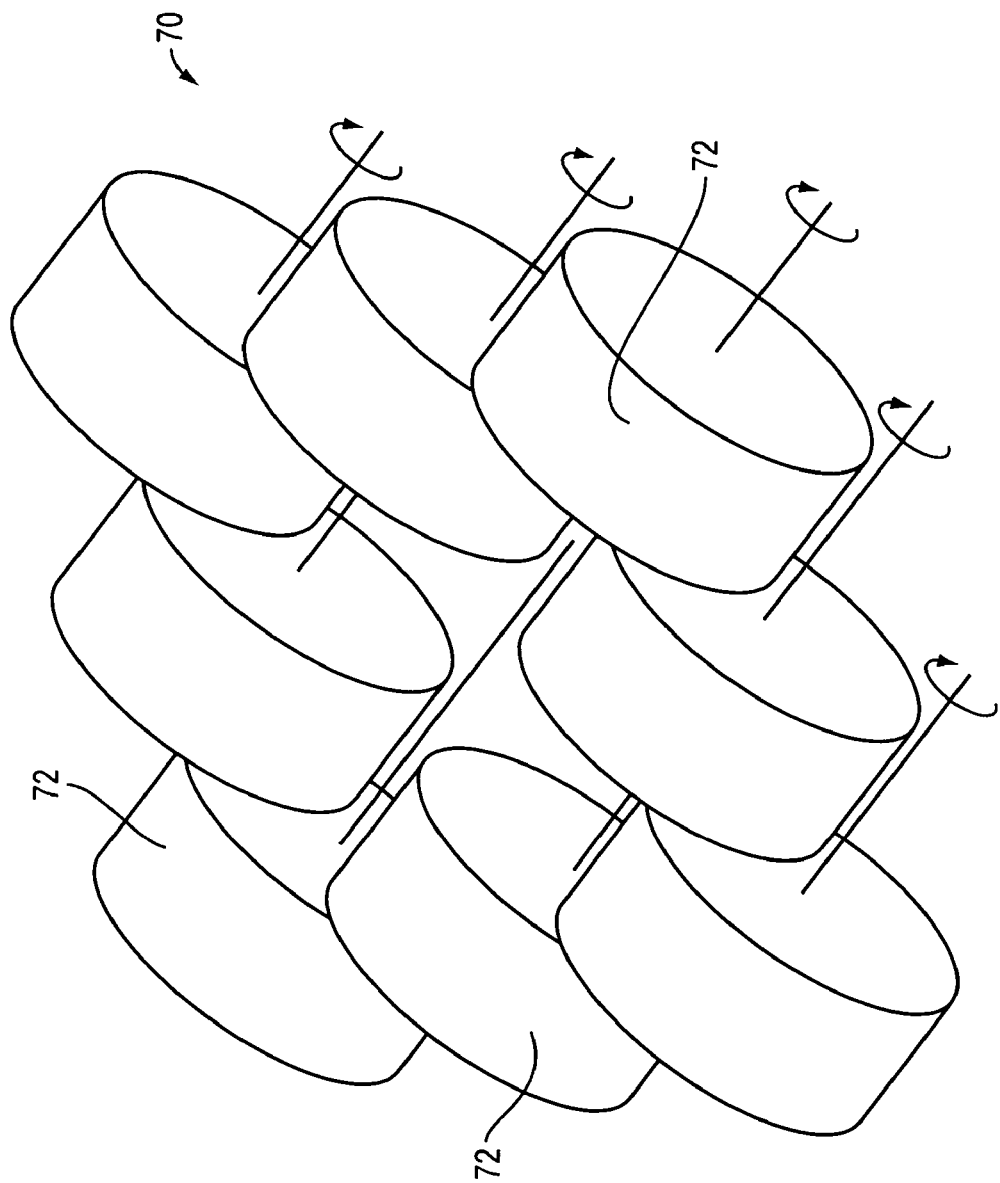
FIG. 19 is a schematic diagram depicting a seal configuration according to an alternative illustrative embodiment of the invention.

However, in some alternative embodiments, slidable seal elements, that is seal elements that do not maintain rolling contact with the surface when the device moves, are used to form portions of the seal perimeter. FIG. 2A shows a combination of rollers and tracks. FIG. 2B shows an all track embodiment. FIG. 19, in part, depicts an all roller embodiment. Combinations of seal elements of these different embodiments are possible. Moreover, these rolling seal element embodiments can be combined with slidable seal elements known in the prior art such as a seal curtain formed of overlapping flexible sheets or fingers. Consequently, hybrid embodiments can include both rolling contact and sliding contact seal elements to define the seal. Additional details regarding some exemplary embodiments of this type are discussed below.

The suction adhesion is held relatively constant by the barrier between the outside environment and the interior environ of the vacuum chamber by the rotating, flexible seals described above that maintain an effective seal as the device 10 locomotes over the surface S, even uneven surfaces. In regard to the material and shape of the suction adhering seal, various materials and/or shapes can be employed effectively, besides those exemplified in the aforementioned alternative embodiments.

Figure 11:
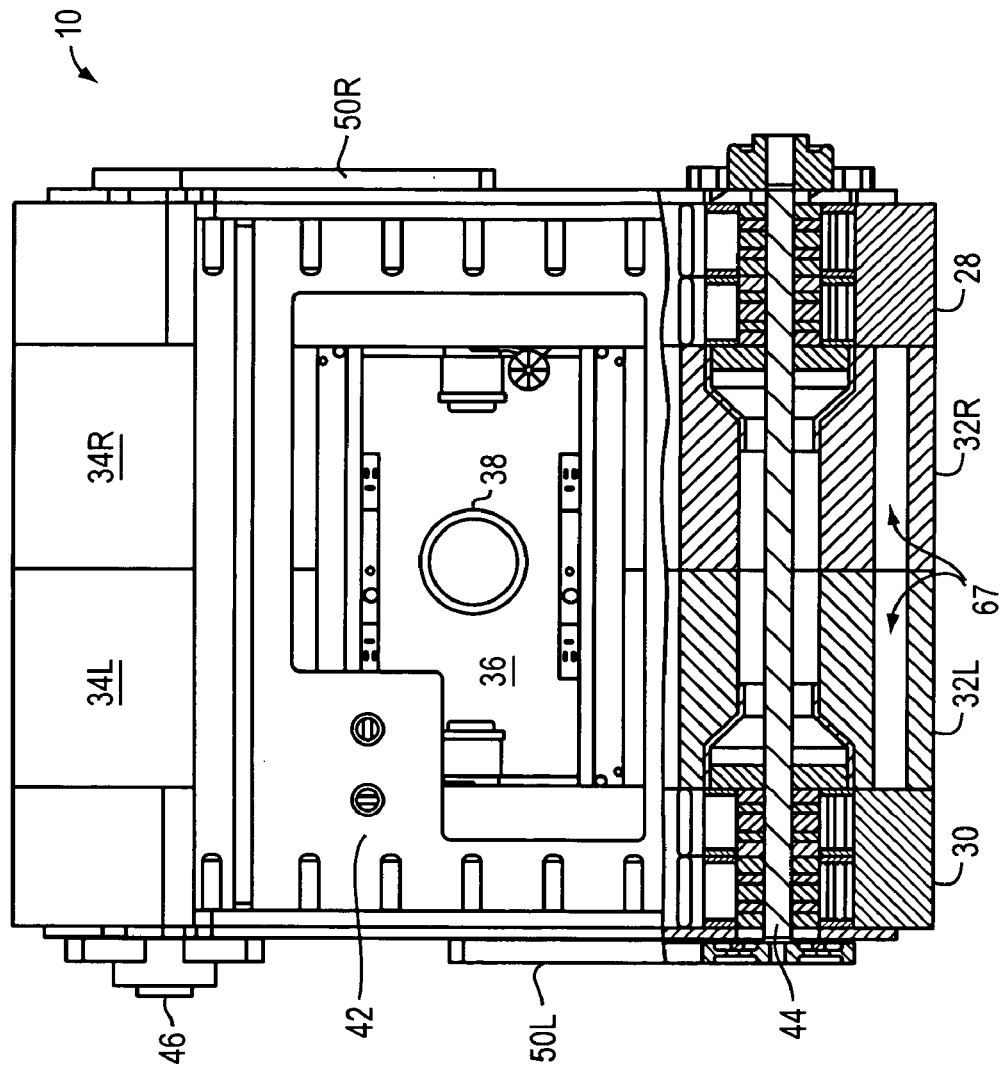
FIG. 11 is a top plan view of a surface traversing apparatus with a sectional view through one hub according to an illustrative embodiment of the invention.
Figure 12:
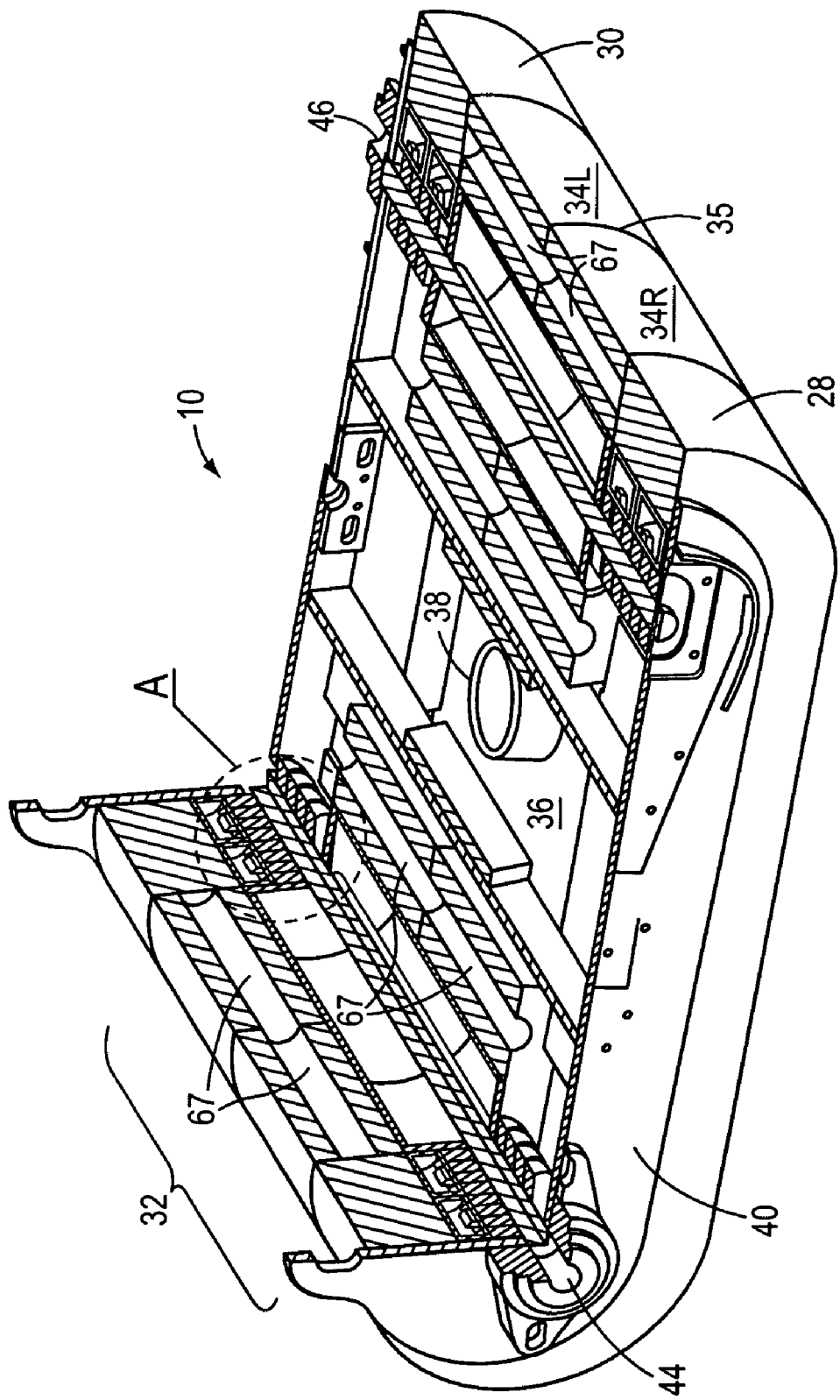
FIG. 12 is a partial longitudinal and hub radial sectional view of a surface traversing apparatus according to an illustrative embodiment of the invention.
Figure 13:
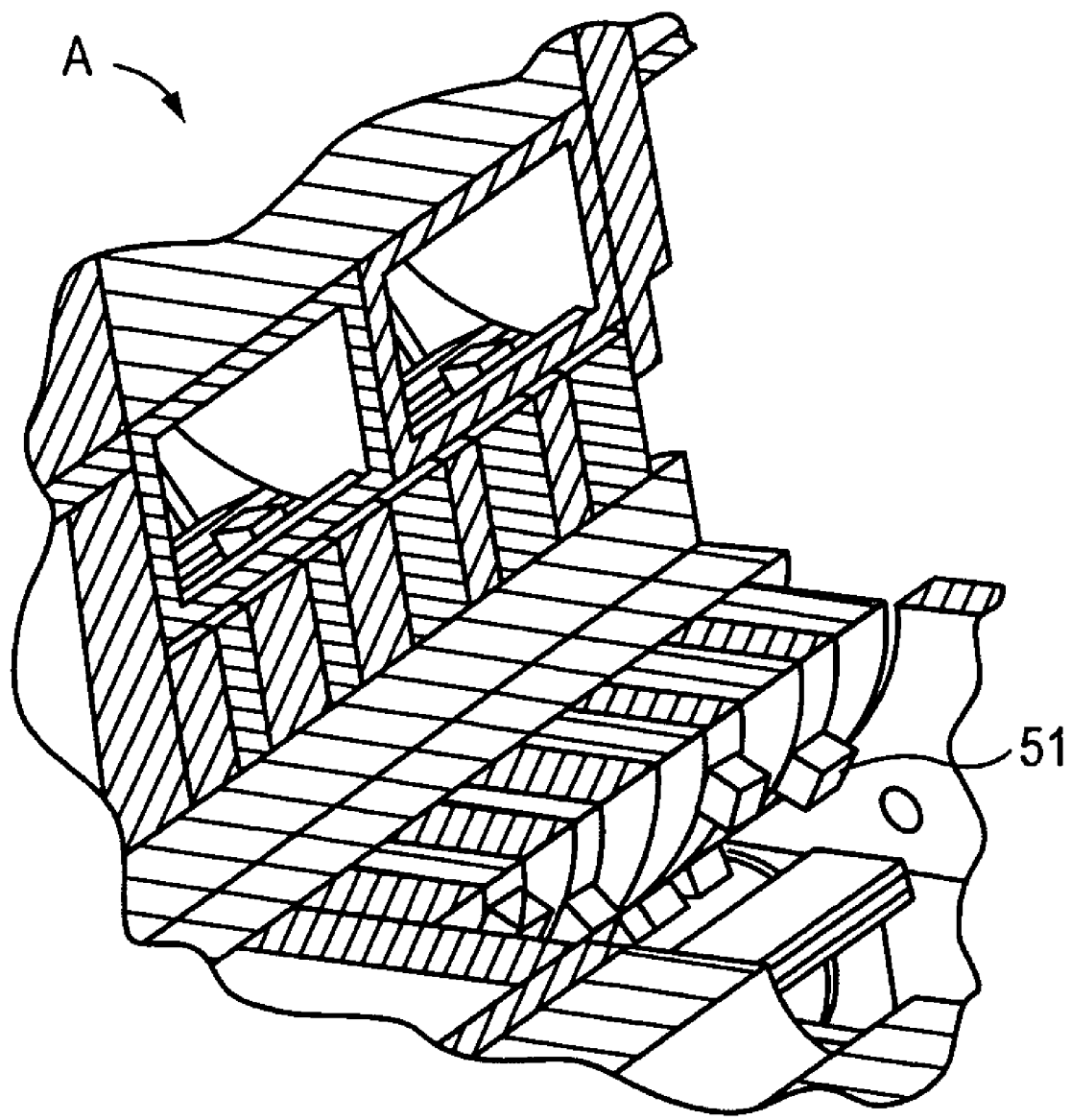
FIG. 13 is an enlarged view of a portion of the sectional view of the hub of FIG. 12.
Figure 14:
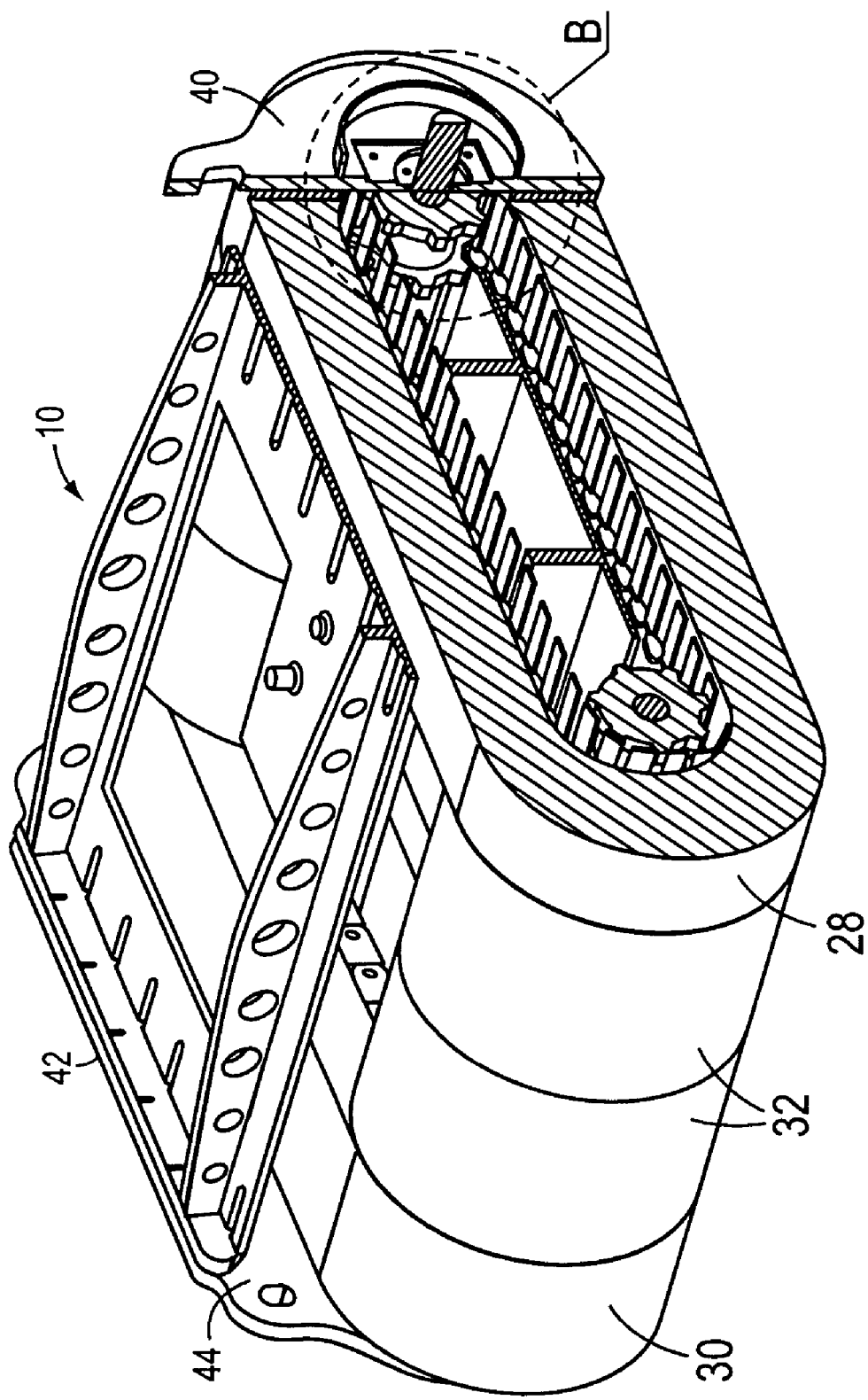
FIG. 14 is a partial sectional side view of a surface traversing apparatus according to an illustrative embodiment of the invention.
Figure 15:
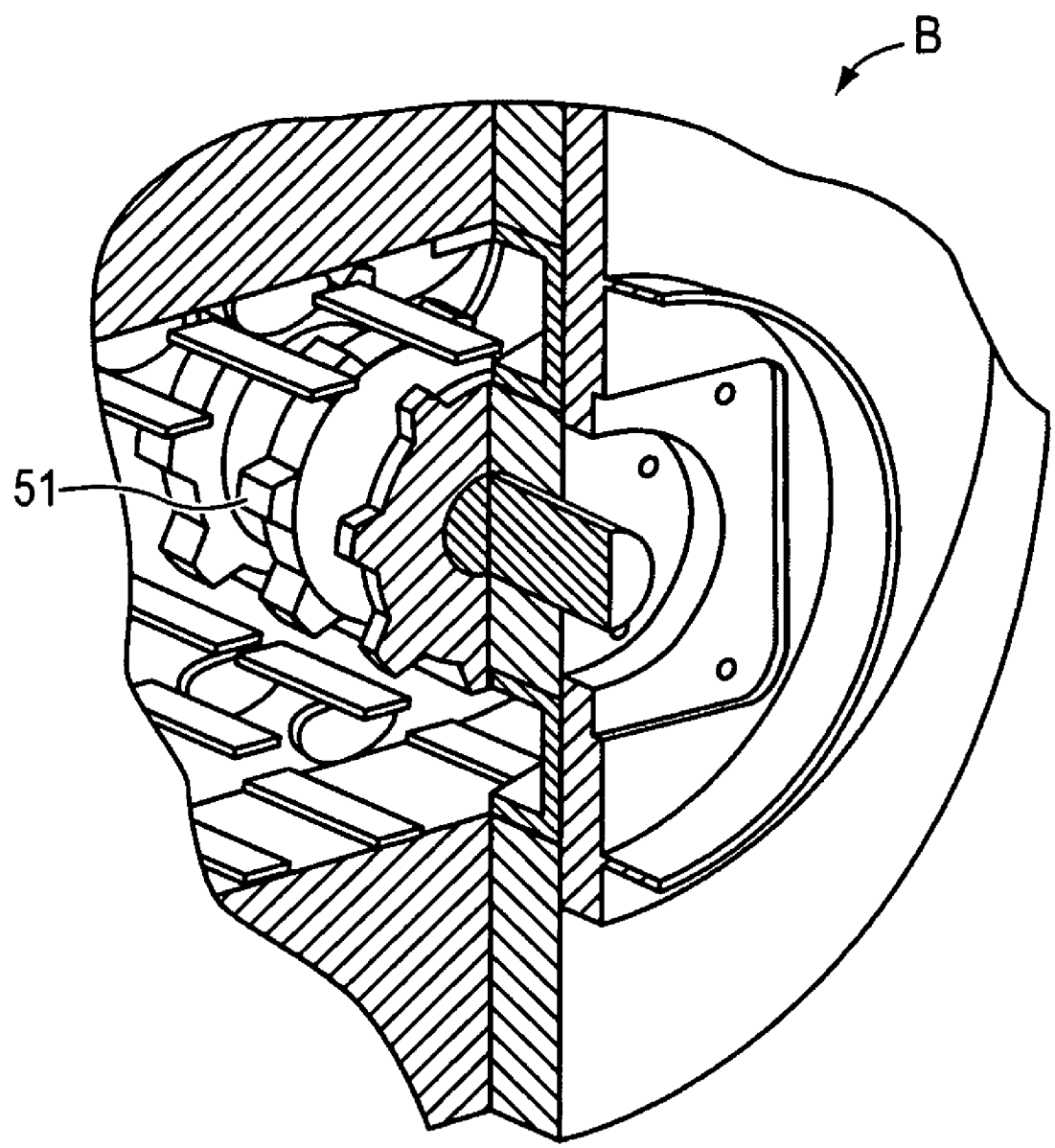
FIG. 15 is an enlarged view of a portion of the sectional view of the hub of FIG. 14.

FIGS. 11 through 15 illustrate differing views and perspectives on some of he elements and features of the device 10 discussed above in relation to FIGS. 1-10. FIG. 11 is a top plan view of the surface traversing apparatus 10 with a sectional view through one hub, illustrating additional details thereof. FIG. 12 shows a partial longitudinal and hub radial sectional view of the surface traversing apparatus 10. Note the region labeled A of the device 10, an enlarged view of which is depicted in FIG. 13. FIG. 14 is a partial sectional side view of the surface traversing apparatus 10. Note the region labeled B, an enlarged view of which is depicted in FIG. 15. In FIGS. 11-15, additional details regarding the drive mechanism of the device 10 are shown in the embodiments illustrated. Suitable drive mechanisms, as known in the art, may be employed advantageously to actuate one or more seal elements.

Additionally, in FIGS. 11-12, another feature of the device 10 relating to mitigating the effects of surface protrusions on seal integrity is shown. Specifically, a plurality of equi-circumferentially spaced, substantially cylindrical voids or crush zones 67 are shown longitudinally disposed within the resilient compliant material forming the outer parts of rollers 32, 34, as shown. Although these crush zones 67 are shown as possessing a substantially cylindrical geometry in this embodiment, they may take the form of one or more voids of various geometry disposed within the roller, regions of varying density within the resilient compliant material, or other suitable configurations. The incorporation of crush zones 67 within the individual seal elements allows for localized areas of increased deformation when a surface protrusion is encountered, rather than more widespread seal surface deformation and the potential for localized seal detachment. This further enhances the ability of the device 10 to maintain adherence to the surface while the seal is rolling and/or negotiating over obstructions.

Figure 16:
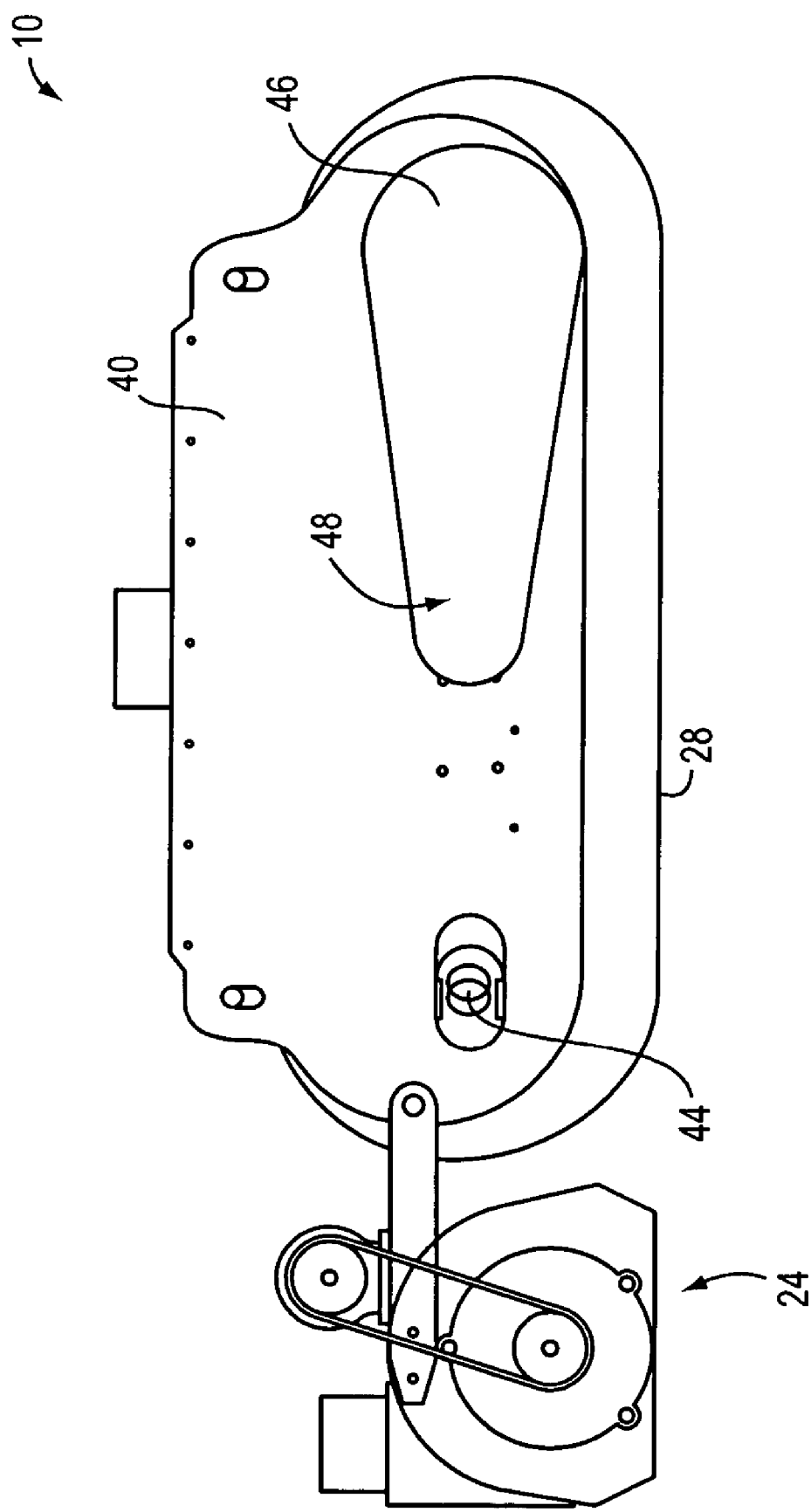
FIG. 16 is side view of a surface traversing apparatus with a trailing surface processing apparatus according to an illustrative embodiment of the invention.

Turning to FIG. 16, the surface traversing apparatus 10 of the invention is shown coupled to a trailing surface processing apparatus 24. Generally, various types of devices or machines may be attached or coupled to the device 10 in order to accomplish manipulation, diagnosis, processing, sensing or otherwise interacting with or modifying the surface being traversed and adhered to by the device 10. In some embodiments, the surface traversing apparatus 10, 10a may directly incorporate surface processing features and functionality, thereby obviating the need for a trailing apparatus configuration. Additionally, in one embodiment the surface processing apparatus 24 includes a seal perimeter made up of locomoting elements, such as those disclosed herein. Thus, the surface processing apparatus 24 can adhere to and traverse a surface using a seal made up of locomoting elements.

Referring to FIG. 18A, in a particular embodiment of this device 10, the surface processing apparatus 24 includes mechanical cleaner tools (e.g., brushes, Rotopeens®, scabblers, etc.) that are attached to the device 10. A separate motor may be provided to drive these mechanical cleaner tools. These tools are also housed within a vacuum shroud to capture the debris/waste generated by the cleaning action of the mechanical cleaners. A separate vacuum source carries the debris/waste down a separate hose to a well-filtered vacuum source and collection bin/container, such as HEPA (High Efficiency Particulate Air) filtered vacuum source. Thus, the device 10 will function as a climbing, cleaning, capturing, and remediating device. The device 10 remediates, because it captures the debris/waste right at the point-of-generation (the cleaning activity) and transfers it through a hose or connection conduit directly into suitable waste collection receptacles. It should be noted that this activity is accomplished with no human contact or introduction of debris or waste into the environment, because the entire cleaning, capturing, and remediating aspects occur with the vacuum shroud or hose. Another advantage of the mechanical cleaners, incorporated in various surface processing apparatus 24, is that they generate no secondary waste in the cleaning process. While shown here as a separate component, the surface processing apparatus 24 can be disposed with the vacuum volume in the device.

Figure 18C:
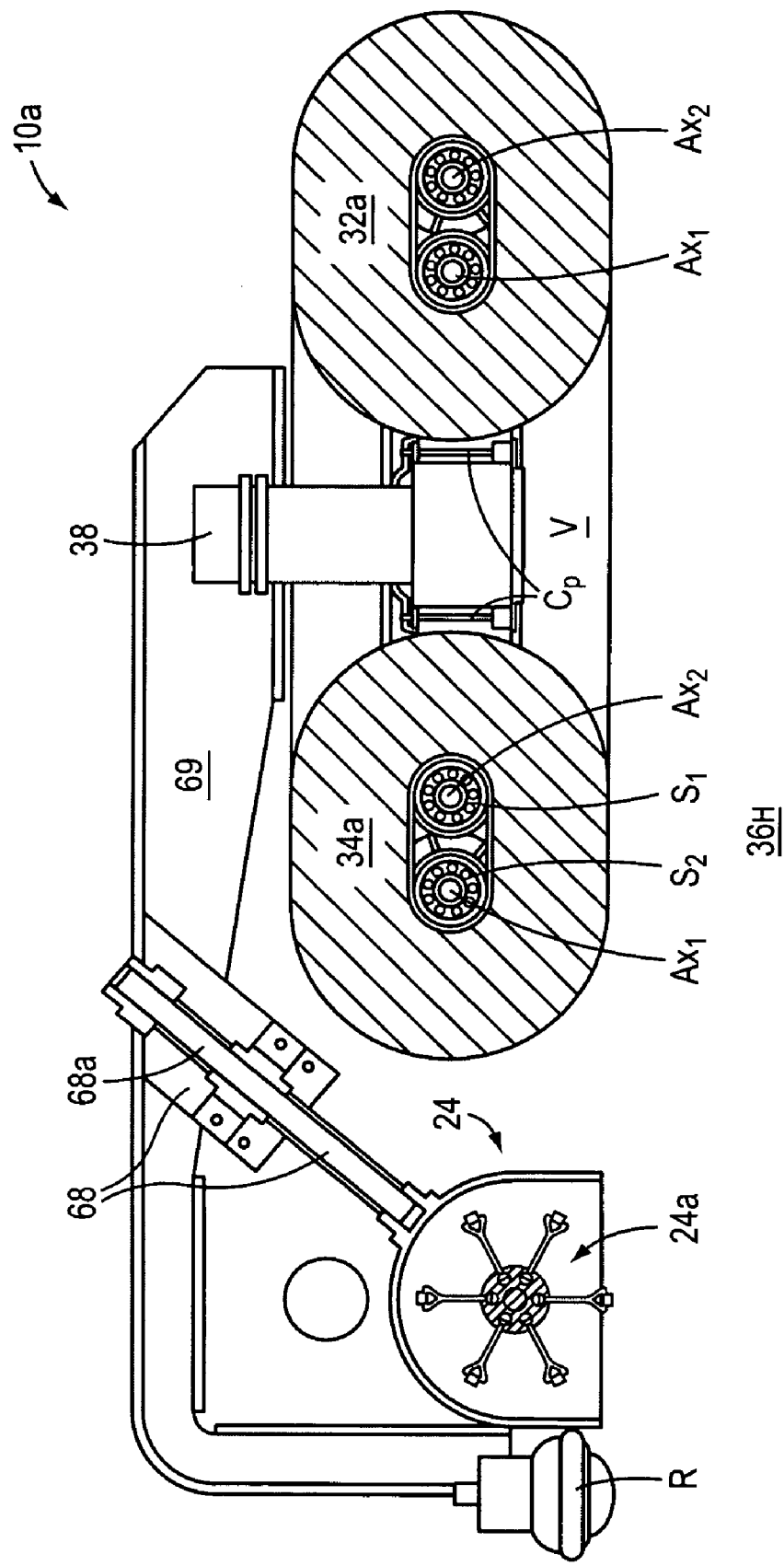
FIG. 18C is a cross-sectional schematic side view of the surface traversing apparatus of FIG. 18B according to an illustrative embodiment of the invention.
Figure 18D:
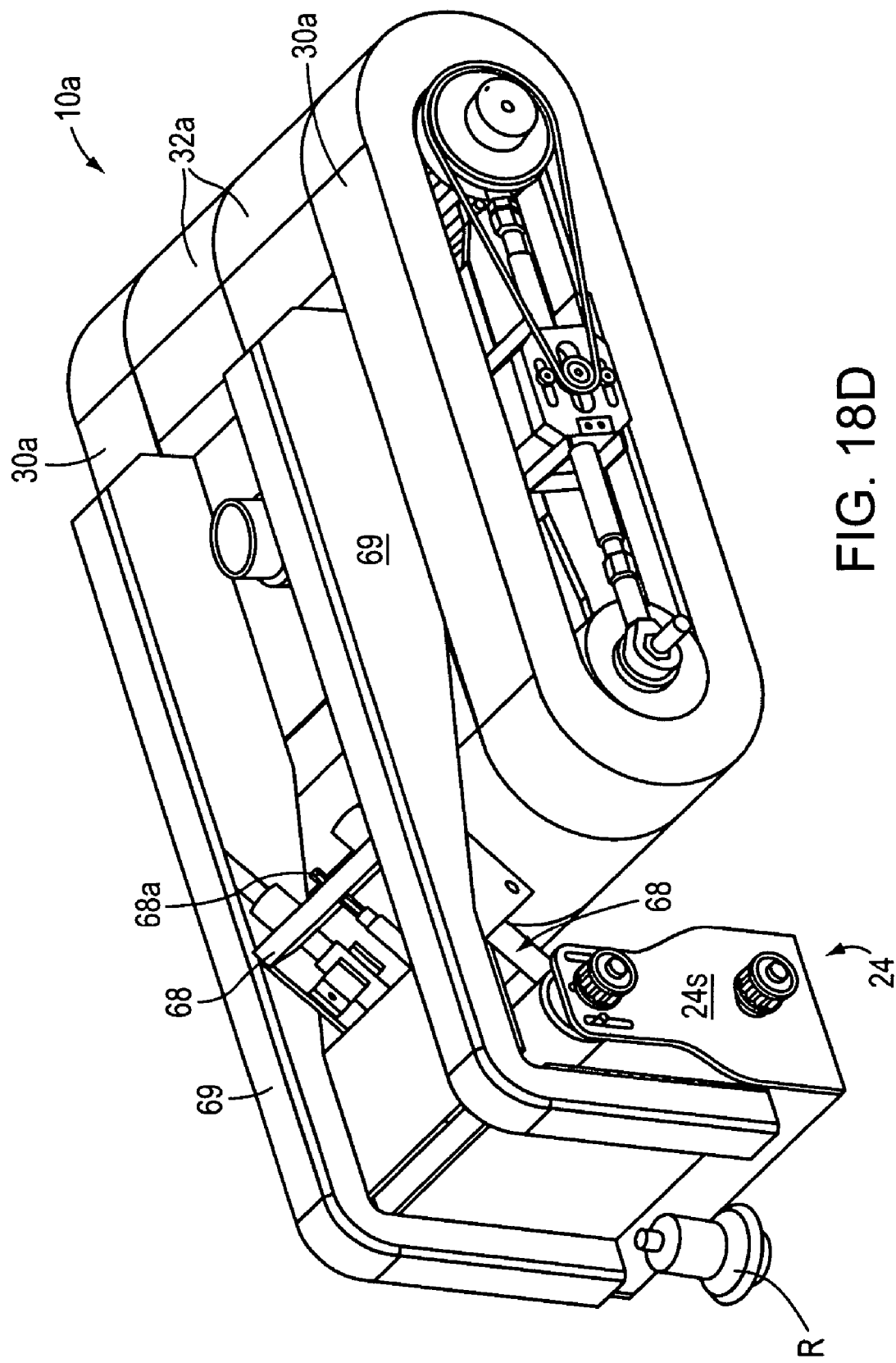
FIG. 18D is a top perspective view of the surface traversing apparatus of FIGS. 18B and 18C according to an illustrative embodiment of the invention.

In FIGS. 18B-18D, the surface processing apparatus 24 depicted is an abrading device. Although, the apparatus shown incorporates a rotating abrading element 24*a*, various embodiments can incorporate different surface processing apparatus types.

As shown in FIGS. 18B-18D, the abrader embodiment of the surface processing apparatus 24 includes an abrader spindle or cleaning head 24*a*; an abrader shroud 24*s* for capturing and containing waste/debris; an abrader drive motor and drive components; an abrader lift and lowering assembly 68 and an abrader frame 69.

In one embodiment, the mechanical abrader is a completely modular assembly that attaches to the device 10*a* and all of its operations are remote controlled at a control pendant or laptop computer located with or adjacent to the control panel for operating the device 10*a*.

The abrading surface processing apparatus 24 shown in FIGS. 18B-D is a rotary or hub styled abrader that cleans by rotation of the abrader head 24*a* on a spindle or shaft. In one embodiment, the abrader head 24*a* is approximately 12 inches long and 4 inches in diameter. The shaft rotates, such that the abrader head elements impinge on the surface to be cleaned. Rotation of the shaft can be generally in the range of 2000 to 4000 rpm, as measured at the spindle. Various interchangeable abraders can be affixed to the spindle. 3M™ makes a Roto Peen™ abrader head 24*a* with tungsten carbide shot attached to flexible wear resistant flaps. These heads can be mounted to the 12 inch long spindles. Wire or synthetic brushes, star cutters and a variety of other mechanical cleaning head technologies can be adapted.

The shroud 24*s* serves to prevent the egress of debris or contamination during the cleaning process. A vacuum hose maybe attached to the shroud, with the hose running from the shroud to a vacuum source that is equipped with filtration, such as a HEPA—(High Efficiency Particulate Air) or ULPA—(Ultra Low Penetration Air) filter. The shroud hose maybe the same or different than the hose in communication with the vacuum chamber. As the abrader cleans, the shrouded vacuum captures all the particles, dust, and debris generated during the cleaning process. In one embodiment, the vacuum hose can be a dual lumen design with one lumen for device vacuum and the other for shroud vacuum, in order to provide contaminant/debris isolation. In other embodiments, the vacuum hose can be a primary hose trunk that divides into two or more secondary vacuum hoses for debris collection.

The surface processing apparatus 24*a* shown in FIGS. 18B-18D can be powered with a motor to turn the spindle at the desired speed. Pneumatic, electric, or hydraulic motors or other suitable power sources can be used, in various embodiments. Furthermore, motor operation can be remote controlled and driven at variable speeds. A human operator typically controls the motor and related parameters; however, control can be automated via a processor or other mechanism such as guidewires, tethers, tracks or other external guiding elements. In the embodiment shown, the abrader's drive motor transfers power to the abrader spindle via two pulleys and a belt. Other transmission drive assemblies known in the art may also be used.

The shroud 24*s* and tool 24*a* ride on the surface on one or more wheels or sliding assemblies R to reduce drag or friction as the apparatus 24 moves along the surface. The assembly R shown is a spherical roller. The element R, in combination with the device's seal perimeter defines a stable operating mode when the device is traversing and adhering to the surface S.

Other elements R disposed along the interior or the exterior of the surface processing apparatus 24 can be used in various embodiments. These elements can include, but are not limited to, wheels, rollers, tracks, bearings, slidable elements, combinations thereof and other suitable devices for supporting the apparatus 24 on a given surface. Additionally, these elements R can incorporate shocks, height controls, rolling sliding seals or other features. The mounting of the element R can be used to set the height of the abrading tool 24*a* or other surface processing device 24 tool relative to the surface. Alternatively, the standoff distance can be by height adjusting elements in the frame or a lift/lowering assembly 68.

Still referring to FIGS. 18B-18D, an abrader lift and lowering assembly 68 can be used to retract or deploy the apparatus 24 relative to the surface. For example, a centrally disposed actuatable lead screw shaft 68*a* and two shock absorbers or guides form the assembly 68. An air motor coupled to the lead screw shaft 68*a* raises and lowers the surface processing apparatus 24 to a desired height from the surface.

The raising and lowering of the apparatus 24 can be accomplished via alternative methods, such as by electric or hydraulic motors. The operation of the motor which raises and lowers the cleaning head 24*a* to the surface can be performed via remote-control by the human operator. In one embodiment, cameras mounted on the device assist the operator in seeing the obstacles on the surface, thereby informing the operator when the abrader assembly needs to be raised away from the surface.

The abrader apparatus 24 is attached to a frame 69 which is attached to the device 10, 10*a*. The frame 69 is designed to facilitate ease of attachment and removal from the device 10, 10*a*. In one embodiment, the frame 69 is fabricated using a carbon fiber/composite construction. However, other lightweight durable construction materials can be used to fabricate the frame. The abrader apparatus elements may be fabricated using lightweight, high strength materials.

Again referring to FIGS. 16 and 18A-18D, in another embodiment, any type of inspection equipment can be mounted on/in or coupled to the device 10, 10*a* as a surface processing apparatus 24, 24*a*. Thus, remote inspections can be performed with this device. Cameras, non-destructive testing probes such as those that can detect surface thickness, cracks, and imperfections, or equipment to detect radiation, chemical/biological, warfare agents, etc., can be mounted to the device 10 to perform remote inspection capabilities, thereby safeguarding human life. This capability is particularly beneficial in highly radioactive or highly toxic areas, where the reduction of exposure to human life of hazardous reagents or environs would be beneficial.

Additional cleaning apparatus employing alternative cleaning methods can also be attached to the device 10 and these cleaning apparatus housed within a vacuum charged shroud so as to capture all the debris/waste generated. Gritblasting, water-blasting, ice pellet blasting, etc. are just a few cleaning methods that can be attached to the device 10. In these cleaning methods, the vacuum cleaning operation captures both the primary waste (i.e., whatever is being removed from the surface) and the secondary waste (i.e., whatever media or agent is used to perform the cleaning, such as the grit, water, or ice).

In another embodiment of the device 10, remote-controlled cameras, testing probes and/or survey equipment can also be attached to the device 10. Thus the device 10 can be used to gather information, perform testing and/or provide visual display, all remotely. Signals for remote control of the device 10 and the data or information collected by the device 10 can be conveyed via cable or radio waves or another method to data collection or video screens located remote from the device 10.

Such fully remote capabilities allow the device 10 to perform cleaning and/or data collection, whereby the human operator can be in a fully safe environment, while the device travels in hazardous or dangerous environments. This remote cleaning and/or remote data collection and testing capability is a highly advantageous application of the device 10.

In accordance with one principle of the invention that favors rolling seal contact over sliding seal contact, turning to FIG. 19, an alternative configuration for the seal 70 of the invention is illustrated. A plurality of individual seal elements 72 are shown arranged in an overlapping sealing configuration. One aspect of the invention contemplates using a plurality of individual seal elements 72 to form a seal 70 having a seal perimeter that can range over any two-dimensional substantially closed shape. Thus, the shape of the seal's boundary can be polygonal, arcuate, combinations thereof or any other suitable shape that facilitates substantially rolling contact with the surface being traversed. Suitable elements for forming a seal 70 typically incorporate a compliant resilient coating or layer and, more specifically, include but are not limited to, rollers, tracks, spherical elements, bead arrays, and other suitable elements capable of locomoting and maintaining a vacuum seal.

Although in one embodiment, all of the elements shown in FIG. 19 can roll while maintaining a vacuum seal, in other embodiments of the invention it may be desirable for one or more portions of the seal to slide relative to the surface. Thus, in various embodiments some of the elements 72 can be fixed or designed to slide relative to the surface, while other elements 72 maintain rolling contact with the surface. In some embodiments, portions of the seal may drag and wear as other seal elements roll along the surface.

For example, in a rectangular seal configuration, such as that depicted in FIGS. 2A-2B, two sides of the surface traversing apparatus' seal can be defined by a pair of parallel oppositely disposed rollers or tracks that maintain substantially rolling contact with the surface. The other two sides of the seal perimeter can include overlapping strips, wedges or other sections of material that form a curtain or lip seal configuration that slides relative to the surface. In combination, the seal elements substantially maintain the vacuum as the device traverses a surface, though the sliding elements would be subject to frictional wear. Such a device may be desirable where particularly large obstructions must be accommodated. For example, a device with rolling foam side seal tracks and front and back curtains can be used to traverse large bolt studs extending from the surface, by straddling the studs with the foam tracks.

Details regarding the weight and dimensions can varying based upon the desired application of the locomoting seal based device 10. The device 10 should generally be as light as possible, to reduce the energy required to power the drive motors and to reduce the vacuum, both flow and suction, necessary to properly hold the device 10 to the surface being traversed. Under 50 pounds (approx 23 Kilos) is the weight of the device in one embodiment. In this embodiment, the climber device 10 dimensions are approximately 20 inches wide by 20 inches long by 8inches in height. The overall weight and dimensions of the "system," including vacuum source, power source of needed, accessories and on-board cleaning/non-destructive testing/robotic arm capabilities should also be as light as possible, to facilitate portability and ease of mobilization/demobilization. Naturally, the system should be sized such that the amount of vacuum and related force required to keep the device 10 adhered to the surface, with sufficient margin to accommodate anticipated transient leakage due to relatively large or commonly anticipated, obstructions and surface discontinuities (for example, surface mounted piping and conduits), is minimally influenced by the steepness, orientation, roughness and material of the surface to be traversed. Additional vacuum margin may be required in particular applications, for example if the surface is semi-porous, if there are occasional perforations or apertures in the surface, etc. to ensure the system maintains adhesion to the surface. The anticipated obstructions and surface discontinuities, however, can also influence the thickness of the selected sealing material, as will be apparent to those skilled in the art. In one embodiment, the sealing material can be Rubatex® R1800-FX closed cell foam, available from RBX Industries, Inc., located in Roanoke, Va.

Various embodiments of the device can be powered by a multiplicity of suitable power supply devices or methods. Power is used to drive the motors that drive the device 10 across a given surface. That power source will depend on the type of motor used. Electric, pneumatic, hydraulic power, etc., are all feasible alternatives. In one embodiment, pneumatic power is selected for its superior torque to weight ratio. Pneumatic solenoids can also be used to control the airflow to the motors; hence, the only power necessary is pneumatic. For additional onboard capabilities, such as a video camera mounted on the device, cleaning tools, NDT (non-destructive testing) instrumentation, robotic arms, etc., power is also required. For video, electric power is the most sensible. For cleaning tools, pneumatic is a likely power source, if pneumatic is used to power the device 10. For NDT instrumentation, electric power is a suitable power source. The same is true for embodiments of the device 10 employing robotic arms. Regardless of the type of power used or the array of power sources, the power can be conveyed to the climber from a source located substantially on the ground via conduit hard wire, or by radio, infrared, light, etc.

Determining the necessary vacuum required within the chamber is defined, at least in part, by the enclosed area of the locomoting seal and the seal with the surface, and can be determined readily by one of ordinary skill in the art. More particularly, this determination of the required vacuum is a function the weight of the device 10 and the height to which it will climb while adhering to a given surface. In various embodiments the vacuum achieved by the device ranges from about 3.5 to about 6 inches of Hg. Preferably, the seal and vacuum assembly achieve a vacuum in the range from about 2 to about 7 inches of Hg, such as, for example, about 2.5 to about 6.5 inches of Hg, about 3 to about 6 inches of Hg, about 3.5 to about 6 inches of Hg, about 4 to about 5.5 inches of Hg, or about 4.5 to about 5 inches of Hg.

Any materials used in conventional construction and manufacture of robotic devices are suitable for use in various embodiments of the device 10, subject to the environmental conditions of the application. In one embodiment, ABS plastic is used to make portions of the device, such as the housing or frame. In other embodiments, suitable metals, wood, alloys or composite materials can be used to fabricate parts of the device 10. In one embodiment the roller shafts include aluminum and/or carbon fiber. The rollers and side tracks are relatively soft, compliant and resilient material. This resilient material can include, but is not limited to, closed cell foams, Neoprene, open cell foams with rubber coating, and combinations thereof.

Open cell foam, such as two pound polyurethane sponge coated with a spray applied polymer Hypolon(tm) coating can be used for the rollers, tracks, or other seal elements. Alternatively, closed cell foam, such as four pound expanded sponge rubber vinyl nitrile can be used. Track and roller materials may also be composites of these materials and other materials. Various materials can be used to provide improved surface obstacle negotiation and turning capabilities, when compared to other materials.

In one embodiment, open cell foam can be coated with a synthetic rubber coating less than about 6 mils thick. The coating prevents the flow of air through the open cell foam rollers/tracks. Coated open cell foam can provide improved obstacle negotiation performance, while closed cell foam can provide improved turning. Suitable foams can be obtained from Merryweather Foam, Inc., Barberton, Ohio.

Additionally, virtually any resilient/flexible material that does not readily allow air to pass through it can be used as a coating for various parts of the device 10 and the seal. In alternative embodiments, the seal can be unpowered and used just for adherence, with additional tracks, wheels, rollers, grippers, etc. used to propel a suitable device 10b across the surface as shown in FIG. 20.

Figure 20:
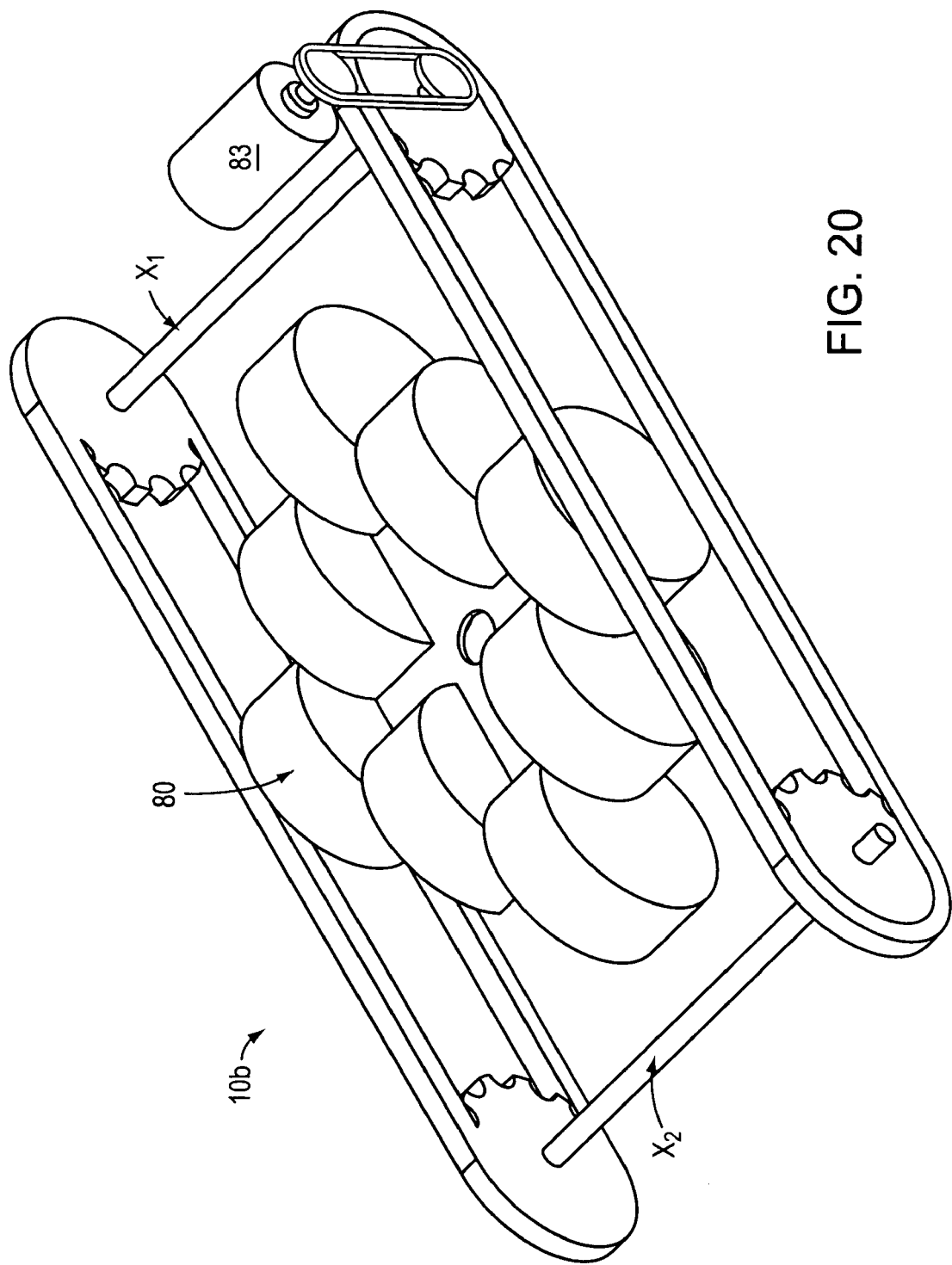
FIG. 20 is a bottom perspective view of a surface traversing apparatus with an embodiment of the seal configuration depicted in FIG. 19 according to an illustrative embodiment of the invention.

Specifically, in FIG. 20 the seal is made up of rolling elements 80 such as those depicted in FIG. 19 that are arranged in a substantially diamond shaped configuration. The rolling elements 80 are not powered and do not provide the driving force in this device 10b embodiment. A motor assembly 83 is used to actively drive one or more axles $X_1$, $X_2$. Tracks and/or rollers can be mounted on the axles $X_1$, $X_2$ in order to move the device 10b across a surface. In some embodiments, a second motor can be included. Thus, the device 10b can locomote across a surface, while the seal elements 80 move and passively maintain the required vacuum seal. The motor 83 or other suitable drive system drives the overall device 10b.

Another embodiment of a surface traversing apparatus with a passive or unpowered seal includes the use of cantilevered direct drive wheels. In such an embodiment, the wheels can be spaced from the side track such that they do not interfere with the sealing action of the side track by holding the apparatus off the surface being traversed. Motors or belts can directly drive these wheels while the rolling or sliding seal portions remain unpowered. Still further, in other embodiments, the surface traversing apparatus can be pulled, pushed or otherwise driven by an auxiliary powered driver or prime mover, for example, in the manner of a multi-car train.

Other device embodiments include devices with an inner seal with at least a portion in rolling contact and an outer seal having sliding contact; devices having all rollers; devices having all tracks; and combinations and hybrid versions thereof as desirable for a given surface traversing application.

It will therefore be seen that the foregoing represents a versatile and convenient approach to the design of surface traversing devices. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. Accordingly, what is desired to be secured by Letters Patent is the invention as defined and differentiated in the following claims, including all equivalents.

What is claimed is:

1. A surface traversing apparatus adapted to be adhered to a surface by a partial vacuum, the apparatus comprising:
   a frame forming a chamber;
   a seal having a seal perimeter defining an opening of the chamber, the seal perimeter having at least a portion for rolling relative to the chamber and for contact with the surface to be traversed to prevent leakage and maintain a vacuum seal with the surface sufficient to adhere the apparatus to the surface, wherein at least a portion of the seal perimeter comprises at least one roller comprising a material selected from the group consisting of closed cell foam, coated open cell foam, and neoprene; and
   a drive powering at least a portion of the seal to move the apparatus relative to the surface.

2. The apparatus of claim 1, wherein the at least one roller comprises a compressible outer surface.

3. The apparatus of claim 1, wherein the drive powers the at least one roller.

4. The apparatus of claim 1 wherein a portion of the seal perimeter comprises at least two rollers.

5. The apparatus of claim 4 wherein the at least two rollers are parallel and disposed on opposing sides of the frame.

6. The apparatus of claim 1 wherein a portion of the seal perimeter comprises a track.

7. The apparatus of claim 6 wherein the track comprises a plurality of contiguous pads.

8. The apparatus of claim 7 wherein at least one pad comprises a flexible sealing element.

9. The apparatus of claim 7 wherein at least one pad comprises a pair of independently compressible flexible sealing elements.

10. The apparatus of claim 6 wherein the drive powers the track.

11. The apparatus of claim 1 wherein a portion of the seal perimeter comprises two tracks.

12. The apparatus of claim 11 wherein the two tracks are parallel and disposed on opposing sides of the frame.

13. The apparatus of claim 1 further comprising means for maintaining the apparatus in contact with the surface.

14. The apparatus of claim 13, wherein the means for maintaining the apparatus in contact with the surface comprises a vacuum source fluidically coupled to the chamber through a connection port mounted to the frame.

15. The apparatus of claim 1 further comprising a processing apparatus mounted to the frame and adapted to process at least a portion of the surface.

16. The apparatus of claim 1 wherein the seal perimeter comprises a closed polygon.

17. The apparatus of claim 16 wherein the polygon is a quadrilateral.

18. The apparatus of claim 1 further comprising a processor for controlling the apparatus.

19. The apparatus of claim 1, wherein the closed cell foam comprises expanded sponge rubber vinyl nitrile.

20. The apparatus of claim 1, wherein the coated open cell foam comprises a polyurethane sponge coated with a spray applied polymer.

21. A surface traversing apparatus adapted to be adhered to a surface by a partial vacuum, the apparatus comprising:
   a frame forming a chamber;
   a locomoting seal mounted to the frame for rolling relative to the chamber and for contact with the surface to be traversed to prevent leakage and maintain a vacuum seal with the surface sufficient to adhere the apparatus to the surface, wherein at least a portion of the locomoting seal comprises at least one roller comprising a material selected from the group consisting of closed cell foam, coated open cell foam, and neoprene; and
   a drive powering at least a portion of the locomoting seal to move the apparatus relative to the surface.

22. The apparatus of claim 21 wherein the locomoting seal comprises a perimeter, at least a portion of which cooperates with the drive to move the apparatus relative to the surface.

23. A surface traversing apparatus, the apparatus comprising:
   a frame;

a seal comprising:
  first and second parallel rollers disposed on opposing sides of the frame, wherein the rollers are rotatably connected to the frame;
  first and second tracks disposed on additional opposing sides of the frame, wherein the rollers and tracks provide rolling contact with the surface to be traversed and maintain a vacuum seal with the surface sufficient to adhere the apparatus to the surface, wherein at least one of the rollers and the tracks comprise a material selected from the group consisting of closed cell foam, coated open cell foam, and neoprene; and
  a drive powering at least a portion of the seal to move the apparatus relative to the surface.

24. The surface traversing apparatus of claim 23, wherein at least one of the first and second rollers comprises an additional track.

* * * * *